(12) United States Patent
Heinla et al.

(10) Patent No.: US 11,442,419 B2
(45) Date of Patent: Sep. 13, 2022

(54) SYSTEM AND METHOD FOR ITEM DELIVERY BY A MOBILE ROBOT

(71) Applicant: STARSHIP TECHNOLOGIES OÜ, Tallinn (EE)

(72) Inventors: Ahti Heinla, Tallinn (EE); Anti Veeranna, Tallinn (EE); Antti Makela, Helsinki (FI); Imre Teras, Saue (EE); Kalle-Rasmus Volkov, Tallinn (EE); Kitty Mamers, London (GB); Lauri Vain, Tallinn (EE); Madis Merila, Tallinn (EE); Markus Zimmermann, Helsinki (FI); Vahur Laas, Keila (EE); Kadri Parikas, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 0 days.

(21) Appl. No.: 16/816,246

(22) Filed: Mar. 11, 2020

(65) Prior Publication Data
US 2020/0209821 A1  Jul. 2, 2020

Related U.S. Application Data

(63) Continuation of application No. PCT/EP2018/074809, filed on Sep. 13, 2018.

(30) Foreign Application Priority Data

Sep. 15, 2017 (EP) .................................. 17191424

(51) Int. Cl.
*G05B 19/042* (2006.01)
*G05B 19/4155* (2006.01)
(Continued)

(52) U.S. Cl.
CPC ....... *G05B 19/042* (2013.01); *G05B 19/4155* (2013.01); *G06Q 20/18* (2013.01);
(Continued)

(58) Field of Classification Search
CPC .. G05B 19/042; G05B 19/4155; G06Q 20/18; G05D 1/0088
(Continued)

(56) References Cited

U.S. PATENT DOCUMENTS

| 4,549,841 A | 10/1985 | Ishige |
| 5,664,928 A | 9/1997 | Stauber |

(Continued)

FOREIGN PATENT DOCUMENTS

| WO | WO 2011/035839 | 3/2011 |
| WO | WO 2016179259 A1 | 11/2016 |

(Continued)

OTHER PUBLICATIONS

Hristov, Luben. "Capacitive Proximity Detection in the Automotive Industry." (2010). (Year: 2010).*
(Continued)

*Primary Examiner* — Mohammad Ali
*Assistant Examiner* — Joshua T Sanders
(74) *Attorney, Agent, or Firm* — Siritzky Law, PLLC

(57) ABSTRACT

A mobile robot is configured for vending consumable items. The robot includes a mobile base; a body comprising an item space; a plurality of support elements located in the item space and configured to support consumable items; an item sensor configured to detect presence of one or more consumable items supported by each of the support elements; and an insert configured to removably fit into the item space, and wherein the insert comprises the support elements and the item sensor. A method for vending consumable items uses the mobile robot.

31 Claims, 28 Drawing Sheets

(51) Int. Cl.
G06Q 20/18 (2012.01)
G05D 1/00 (2006.01)

(52) U.S. Cl.
CPC ............... *G05B 2219/2645* (2013.01); *G05B 2219/40233* (2013.01); *G05D 1/0088* (2013.01)

(58) Field of Classification Search
USPC ........................................................ 700/236
See application file for complete search history.

(56) References Cited

U.S. PATENT DOCUMENTS

| | | | |
|---|---|---|---|
| 5,942,869 A | 8/1999 | Katou et al. | |
| 6,204,763 B1 | 3/2001 | Sone | |
| 6,467,293 B1 | 10/2002 | Goosman | |
| 6,602,037 B2 | 8/2003 | Winkler | |
| 7,073,634 B2 | 7/2006 | Mitchell et al. | |
| 7,320,289 B1 | 1/2008 | Clarke et al. | |
| 7,894,939 B2 | 2/2011 | Zini et al. | |
| 7,931,431 B2 | 4/2011 | Benedict et al. | |
| 8,010,230 B2 | 8/2011 | Zini et al. | |
| 8,104,601 B2 | 1/2012 | Hayduchok et al. | |
| 8,204,624 B2 | 6/2012 | Zini et al. | |
| 8,485,285 B2 | 7/2013 | Ferrigni | |
| 8,874,360 B2 | 10/2014 | Klinger et al. | |
| 8,948,914 B2 | 2/2015 | Zini et al. | |
| 9,020,632 B2 | 4/2015 | Naylor | |
| 9,031,692 B2 | 5/2015 | Zhu | |
| 9,244,147 B1 | 1/2016 | Soundararajan et al. | |
| 9,250,003 B2 | 2/2016 | Kim et al. | |
| 9,256,852 B1 | 2/2016 | Myllymaki | |
| 9,266,675 B2 | 2/2016 | Yamashita | |
| 9,373,149 B2 | 6/2016 | Abhyanker | |
| 9,557,740 B2 | 1/2017 | Crawley | |
| 9,561,941 B1 | 2/2017 | Watts | |
| 9,694,976 B1 | 7/2017 | Wurman et al. | |
| 9,844,879 B1 | 12/2017 | Cousins et al. | |
| 10,239,378 B2 | 3/2019 | Liivik et al. | |
| 10,262,294 B1* | 4/2019 | Hahn | G01G 19/4144 |
| 2002/0125263 A1 | 9/2002 | Credle et al. | |
| 2003/0165373 A1 | 9/2003 | Felder et al. | |
| 2004/0256872 A1 | 12/2004 | Piper et al. | |
| 2005/0207876 A1 | 9/2005 | Springwater | |
| 2006/0237239 A1 | 10/2006 | Bruner et al. | |
| 2012/0090110 A1 | 4/2012 | Van Den Berg et al. | |
| 2012/0200385 A1* | 8/2012 | Savage | G06Q 10/0875 340/5.7 |
| 2013/0110281 A1 | 5/2013 | Jones et al. | |
| 2013/0332021 A1 | 12/2013 | Goren | |
| 2014/0136414 A1 | 5/2014 | Abhyanker | |
| 2014/0254896 A1 | 9/2014 | Zhou et al. | |
| 2014/0312051 A1 | 10/2014 | Rose et al. | |
| 2014/0365258 A1 | 12/2014 | Vestal et al. | |
| 2015/0006005 A1 | 1/2015 | Yu et al. | |
| 2015/0045945 A1 | 2/2015 | Zini et al. | |
| 2015/0100152 A1* | 4/2015 | Barragan | G07F 9/10 700/232 |
| 2015/0183581 A1 | 7/2015 | Worsley | |
| 2015/0202770 A1 | 7/2015 | Patron et al. | |
| 2015/0379468 A1 | 12/2015 | Harvey | |
| 2016/0185466 A1 | 6/2016 | Dreano, Jr. | |
| 2016/0207710 A1 | 7/2016 | Conrad et al. | |
| 2016/0325928 A1 | 11/2016 | Lepek et al. | |
| 2016/0355337 A1 | 12/2016 | Lert et al. | |
| 2016/0368464 A1 | 12/2016 | Hassounah | |
| 2017/0017237 A1 | 1/2017 | Tokuyama et al. | |
| 2017/0100837 A1 | 4/2017 | Zevenbergen et al. | |
| 2017/0148005 A1* | 5/2017 | Murn | G06Q 10/087 |
| 2017/0185853 A1 | 6/2017 | Yokota et al. | |
| 2017/0220981 A1 | 8/2017 | Shucker et al. | |
| 2017/0267452 A1 | 9/2017 | Goren et al. | |
| 2018/0020896 A1 | 1/2018 | High et al. | |
| 2018/0053369 A1* | 2/2018 | High | G01C 21/3605 |
| 2018/0091782 A1* | 3/2018 | Bashkin | G07C 9/00896 |
| 2018/0194411 A1 | 7/2018 | Liivik et al. | |
| 2018/0232839 A1 | 8/2018 | Heinla et al. | |
| 2018/0293857 A1 | 10/2018 | Berglund et al. | |
| 2018/0349834 A1 | 12/2018 | Heinla et al. | |
| 2019/0033883 A1* | 1/2019 | Ferguson | B60P 1/36 |

FOREIGN PATENT DOCUMENTS

WO   WO 2017064202 A1   4/2017
WO   WO 2017076813 A1   5/2017

OTHER PUBLICATIONS

Yang Technologies GmbH & Co, Capacitive Sensors for Non-Contact Position and Displacement Measurements and Nanopositioning (2016) retrieved from https://web.archive.org/web/20160707022337/http://www.chenyang-ism.com/CapaSensorPosi.htm on May 2, 2022 (Year: 2016).*
Cute Robots Now Delivering Food in Major Cities—U.S. & Europe—"Starship Robots", p. 1 pp., XP054978832, Aug. 5, 2017; Retrieved from the Internet: https://www.youtube.com/watch?v=CLcBdDZDdXQ.
Marble's delivery robot rolls through SF, p. 1 pp., XP054978833, Apr. 12, 2017; Retrieved from the Internet: https://www.youtube.com/watch?v=pH4G-hoIY.
Baker: "Automated Street Crossing for Assistive Robots" Proceedings of the 2005 IEEE, Jun. 28-Jul. 1, 2005 fhttp://citeseerx.ist.psu.edu/viewdoc/download?doi=10.1.1.124.2156&rep=rep1&type=pdf.
Jeniece Pettitt: "Forget-delivery-drones-meet-your-new-delivery-robot" Nov. 2, 2015 Retrieved from the Internet: URL: https://www.cnbc.com/2015/11/02/forget-delivery-drones-meet-your-new-delivery-robot.html.
Anonymous: "Lieferroboter Starship: "Klauen würde ich ihn nicht" Auto—Tagesspiegel" Nov. 29, 2015 Retrieved from the Internet: URL1: http://www.tagesspiegel.de/mobil/lieferroboter-starship-klauen-wuerde-ich-ihn-nicht/12647114.html.
WIPO, Written Opinion of the International Searching Authority, PCT/EP2018/074809, dated Mar. 21, 2019 (12p.).
WIPO, International Search Report, PCT/EP2018/074809, dated Mar. 21, 2019 (4p.).
EPO, Examination Report for European Application No. 18765663.2, dated Nov. 29, 2021. (7 pages).

* cited by examiner

SYSTEM AND METHOD FOR ITEM DELIVERY BY A MOBILE ROBOT

RELATED APPLICATIONS

This application is a continuation of PCT/EP2018/074809, filed Sep. 13, 2018 which claims priority to European (EP) patent application no. 17191424.5, filed Sep. 15, 2017, the entire contents of both of which are hereby fully incorporated herein by reference for all purposes.

FIELD

The invention relates to robots delivering items to customers. More specifically, the invention relates to on-demand delivery of specific items such as consumables.

INTRODUCTION

On-demand product delivery is a booming modern industry. Consumers often want to have meals, beverages, snacks or other consumables delivered to them at their convenience. Many courier or delivery services offer delivery on a very short notice for a certain price. Recently, the delivery process has been automated to more and more, including the increasing use of delivery robots configured to travel at least partially autonomously to deliver items to delivery recipients.

On the other hand, consumers often desire to purchase items such as snacks or beverages on the go. For example, consumers often recourse to the convenience of vending machines available for use at any time and offering a limited number of consumable items appealing to customers. Many types of vending machines are known in the art, but these are generally stationary (some comprise wheels for facilitating installing and replacing the machine).

US patent application 2004/0256872 discloses a mobile vending unit having a load space for storing and/or displaying products. The load space is accessible via two opening doors, the doors being respectively located on a side wall and a rear wall of the load space.

That is, the above application essentially discloses a vending machine or system that can be easily moved from one location to another.

U.S. Pat. No. 9,250,003 discloses a robot refrigerator and a robot refrigerator system. The robot refrigerator is remotely controlled. The robot refrigerator generates image information from a surrounding image and transmits the generated image information to a wireless communication device. The wireless communication device remotely controls the robot refrigerator, or monitors or remotely controls the robot refrigerator in real time, so that the robot refrigerator easily avoids an obstacle, and thus, minimizes a movement time of the robot refrigerator. Thus, user convenience and system reliability is improved.

Although the application briefly discloses an obstacle detection module, no details are given, and the invention is meant to be used indoors, likely at home.

SUMMARY

In light of the above, it is the object of the present invention to provide devices, systems and methods directed to a vending service to customers. It is another or an alternative object of the present invention to disclose a mobile robot comprising preloaded items to be sold to customers upon request.

In a first embodiment, a mobile robot configured for vending consumable items is disclosed. The mobile robot comprises a mobile base, a body comprising an item space, a plurality of support elements located in the item space and configured to support consumable items, and an item sensor configured to detect the presence of the consumable items supported by each of the support elements.

The mobile base of the robot can comprise a frame with wheels attached to it. A plurality of motors can be provided to allow the robot to propel itself. The robot can comprise a different number of wheels, such as two to ten wheels. Preferably, the robot can comprise four to eight wheels, such as six wheels.

The body of the robot can comprise a plastic or a metal-reinforced plastic material. Other materials are also possible. The item space is preferably located inside the robot, surrounded on four sides by the body, on the bottom by the frame or another part of the body, and preferably covered by a lid on top. However, a different arrangement of the item space, such as a side lid is also possible.

The mobile robot can be an autonomous or a semi-autonomous robot configured for ground-based travel. Note, that as used herein, the terms autonomous or semi-autonomous robot can be used to mean any level of automation depending on the task that the robot is performing That is, the robot can be adapted to function autonomously or semi-autonomously for most of the tasks, but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals).

In some embodiments, the robot can further comprise at least one insert configured to removably fit into the item space comprising the support elements and the item sensor. That is, in such embodiments, the consumable items can be supported by support elements which are part of an insert. The insert can comprise a preferably plastic structure that can be easily mounted inside the item space of the robot and easily removed from it by preferably authorized persons only. That is, the insert can be preferably locked inside the item space with an electronic and/or mechanical locking element. The advantage of using an insert is that it can be optimized for vending consumable items without optimizing the whole mobile robot in this way. In other words, the item space of the mobile robot can be used for carrying an arbitrary item for an arbitrary purpose (such as packages for package delivery, takeaway food, newspapers, grocery deliveries and other purposes), while the insert can be specifically manufactured in a way that allows for easy use of the mobile robot as a mobile, preferably on-demand vending machine. By using an insert for this purpose, the mobile robot can be quickly changed from a specifically vending-optimized mobile robot to a general purpose mobile robot with a space for carrying items. Note, that a plurality of inserts fitting inside one item space is also possible. For example, two inserts comprising different support elements can be placed inside one item space.

In some such embodiments, the insert can comprise a top surface and the support elements comprise indentations located in the top surface of the insert (and going all the way through the top surface or top plate of the insert so as to comprise holes). That is, the insert can have a relatively flat surface facing towards the lid of the mobile robot when the lid is placed on top of the item space. This surface can comprise indentations or holes, into which consumable items can be placed. This can be very useful, as the consumable items can be supported by the indentations when the mobile robot is travelling and not bounce around the item space or the insert. The shape and depth of the indentations can be changed based on the desired consumable items. For example, for carrying beverages, the indentations can comprise a substantially circular cross-section and be deep enough to support either cans or bottles (such as at least 5 cm, preferably at least 8 cm, such as at least 10 cm). Alternatively or additionally, for take-out boxes, the indentations can comprise a substantially square and/or rectangular cross-section, potentially be tapered, and comprise a depth sufficient to support take-out boxes (such as at least 5 cm). Different inserts comprising different types of indentations (or support elements) can be produced. This can also be particularly advantageous for using removable inserts: when vending different types of items, the inserts can be easily exchanged. One insert can also comprise different types of indentations for carrying a plurality of different consumable items. For example, half of the top surface of the insert can comprise circular indentations for carrying drinks, and the other half can comprise rectangular indentations for carrying snack or chocolate bars.

In some embodiments, the item sensor can comprise a capacitive sensor. That is, the item sensor can comprise two conducting plates and an integrated or remote processor configured to determine a change in the separation between the plates resulting from weight being placed on top of or removed from the plates. In some such embodiments, the item sensor can comprise a base plate and a plurality of pads, each of the pads comprises a conductive plate with the base plate serving as a second conductive plate for all of the pads, and each of the pads can be configured to be placed below each of the support elements. In this way, once a consumable item is placed or removed to/from each of the support elements, it will press down on the pad below the support element, and influence the separation between the particular pad and the base plate, resulting in a changing capacitance. The support elements preferably comprise indentations in such embodiments. In other words, the item sensor can be placed below the end of the indentations in the top surface of the insert. The pads can be individually placed below each of the support elements, so that a removal of consumable items or their return can be individually detected. Note, that that pads can also comprise the "floor" or bottom of the indentations, and it this sense be placed "within" or "as a part of" the support elements, rather than below. This meaning is therefore also part of the present disclosure. The base plate can be one solid plate stretching below the pads along the whole surface area of the insert's top surface (or the part of it comprising the support elements). It can be advantageous to have one single base plate, since less manufacturing can be required and it is can be sufficient to have individual pads for individual support elements to distinguish which consumable item has been withdrawn. The pads need not to exactly correspond in shape to the shape of the support elements (particularly in embodiments where they comprise indentations), they can be of a generally similar cross-section, but can comprise a shape that is more practical to manufacture and install.

The pads can be manufactured from different conductive materials such as, for example, copper. The surface area of the pads can be about the same as the surface area or cross-section of the support elements. For example, support elements configured to support beverages can comprise a substantially circular cross-section with a radius of between 3 and 7 cm. The pads can comprise a similar radius, although their shape need not be circular, and can be an arbitrary shape such as square, rectangular, and/or another similar shape.

The capacitive sensor can be placed at the bottom of the insert, so that in embodiments where the support elements comprise indentations, the sensor can be integrated into or constitute the bottom or floor of these indentations. That is, consumable items would be placed into indentations and be supported on the bottom by the floor, preferably by the pads (note, that there may be a cushioning or otherwise surface between the pads and the consumable items).

Note, that each of the pads can comprise an independent capacitive sensor in combination with the base plate, but the plurality of such independent sensors are also referred herein as an item sensor.

The item sensor can also comprise a different sensor, or a combination of a capacitive sensor and another sensor. For example, the item sensor can comprise an infrared sensor. It can also comprise a photoelectric sensor. It can further comprise a sonar sensor and/or an ultrasonic sensor. It can also comprise a mechanical sensor such as a switch and/or a button pressed when a consumable item is placed upon it. Preferably, the item sensor comprises a combination of two or more of the above sensors for a very high rate of correct detection of the removed items.

In some embodiments, the mobile robot can further comprise a lid configured to cover the item space. As described above, the lid can be a convenient element shielding the item space and the consumable items within from unauthorized access. The lid can also comprise an electronic lock, that can be opened to provide a user or a customer access to the consumable items, but remain closed while the robot is travelling or standing by without a customer nearby.

In some such embodiments, the mobile robot can further comprise a lid sensor configured to detect whether the lid is open or closed. The lid sensor can comprise a motion detector such as an optical, microwave and/or acoustic sensor or a combination thereof. In an exemplary embodiment, the lid sensor can comprise an infrared proximity sensor. The lid sensor can also comprise a mechanical sensor or be based on the status of the electronic lock (lock/unlocked). In some such embodiments, the item sensor can activate only when the lid sensor detects that the lid is open. That is, the item sensor can be inactive or not "on" while the robot is travelling, and therefore experiencing the associated vibrations and jolts. This can be advantageous, since it can reduce the number of false detection of consumable items being removed from the support elements due to the robot shaking while moving.

In some embodiments, the mobile robot can further comprise a second item sensor configured to detect at least one of different consumable items supported by different support elements, and/or items different from the consumable items supported by the support elements.

That is, the second item sensor can be used to detect a consumable item that was removed from the support element and then replaced in a different place, supported by a different support element. The second item sensor can also be used to detect items that are erroneously or intentionally placed into the item space instead of the consumable items. For example, the second item sensor can detect a user accidentally or intentionally exchanging a consumable item with their water bottle.

In some such embodiments, the second sensor can comprise a visual camera. That is, such a camera (or cameras) can be used to detect images of the consumable items supported by the support elements. The images can then be processed to extract information indicating which items are supported by which support elements. For example, if a user removes a soft drink bottle from one of the support elements and replaces it with a water bottle, this can be detected on the images, and the user can be notified of their mistake or intentional replacement.

In some embodiments, the second sensor can be placed on the side of the lid facing the item space. That is, the second sensor can "look down" on the item space when the lid is in the raised position. In other embodiments, the second sensor can be placed on the bottom side of the insert. In such cases, the insert can be transparent or comprise holes in case the second sensor comprises a visual camera.

In a second embodiment, the invention discloses a system configured for vending consumable items. The system comprises a mobile robot comprising a mobile base, a body comprising an item space, a plurality of support elements configured to support items, and an item sensor configured to detect the presence of the consumable items supported by each of the support elements. The system further comprises a server and a vending terminal. The server is configured to communicate with the mobile robot and the vending terminal.

The mobile robot can be as described above in the preceding embodiments and/or below in the figure description.

The server can comprise a remote server such as a cloud server or a collection of servers.

The vending terminal can comprise a personal computing device (and/or a personal electronic device) that is configured to communicate with the server. For example, the vending terminal can comprise a smartphone, a tablet, a wearable computing device (such as a watch, glasses, contact lenses, or another wearable device) and/or a laptop. The communication with the server can be established, for example, via an interface such as an app. The user of the vending terminal is referred herein as a user of the mobile robot and/or a customer.

In some embodiments, the mobile robot can further comprise a communication component configured to communicate with the server. The communication between the server and the robot can be done via a SIM card, a modem and/or a plurality or a combination of both located on the mobile robot. That is, the communication component can also comprise a combination of several devices such as several modems or SIM cards. The robot can receive commands from the server such as commands to travel to a certain place, commands to open the lid and other commands. The robot can send the server data obtained by its item sensor and further onboard sensors, and the server can then relay some of this data to the vending terminal.

The advantage of the robot and the vending terminal communicating through a server is in that the server can comprise a larger computing reserves and can coordinate such communication efficiently.

In embodiments where the mobile robot comprises an insert that can be removably fixed in the robot's item space, the insert can also comprise a separate communication component from the robot's communication component. In the present document, "communication component" would then refer to the component of the insert, since this communication component would send and receive information directly related to the vending of items (as opposed to a communication component inbuilt into the robot, which may coordinate navigation and localization, onboard diagnostics and other tasks not directly related to vending of the items).

In some embodiments, the mobile robot can be configured to allow access to its item space based on a command from the server. For example, the server may send the mobile robot a command to unlock an electronic lock preventing the lid from being opened.

In some embodiments, the server can be configured to command the mobile robot to allow access to its item space based on a request from the vending terminal. For example, the server may give such a command when the customer communicates through the vending terminal that they are ready to retrieve consumable items from the robot.

In some embodiments, the item sensor can be configured to detect consumable items removed from the support elements while access is allowed to the item space. That is, the item sensor can detect individual consumable items removed from individual support elements and thereby infer which items the user removed from the mobile robot while having access to its item space. In some such embodiments, the robot can be configured to communicate which consumable items have been removed from the support elements as detected by the item sensor to the server, and the server can be configured to communicate to the vending terminal which consumable items have been removed and their cost.

In some embodiments, the item sensor can be further configured to detect any consumable items returned to the support elements after being removed. In some such embodiments, the robot can be further configured to communicate which consumable items have been returned to the support elements after being removed to the server, and the server can be configured to communicate to the vending terminal an updated list of removed consumable items and their cost. This can be advantageous when a user simply wants to look at a certain item closer, but then decides to put it back into the robot and not purchase it.

In a third embodiment, the invention discloses a method for vending consumable items using a mobile robot. The method comprises providing the mobile robot comprising a mobile base, a body comprising an item space, a plurality of support elements configured to support items, and an item sensor configured to detect the presence of the consumable items supported by each of the support elements. The method also comprises loading the support elements of the mobile robot with a plurality of consumable items at a first location. The method further comprises the mobile robot travelling to a second location. The method also comprises allowing access to the consumable items in the item space of the mobile robot at the second location. The method further comprises the mobile robot detecting which consumable items have been removed from the support elements using the item sensor.

In other words, the method discloses using a mobile robot as an on-demand vending machine. The robot can be filled with consumable items at a first location (which can comprise a hub, a business and/or another location), travel to a second location (preferably after being requested to do so by a vending terminal that a user of the vending service uses), and allow a user to remove consumable items in such a way that the removed items are identified by the item sensor.

Such a mobile on-demand vending service is particularly advantageous, as it can save users time and present a convenience that can be used outside of normal working hours. The mobile robot can be deployed at university campuses, firm campuses, in public parks and in other public spaces. The robots can roam around on a certain trajectory or be stationary when not travelling to a user-indicated location.

The mobile robot can be as described in the embodiments above and below and in the figures.

In some embodiments, the method can further comprise providing a server and a vending terminal. The server can be configured to communicate with the mobile robot and the vending terminal. The vending terminal and the server can be as described above and below in the embodiments and in the figures.

In some such embodiments, the method can further comprise, before the mobile robot travelling to the second location, the vending terminal requesting the mobile robot to travel to the second location by communicating with the server. The server can coordinate one or more robots and direct them to navigate to locations indicated by the users. That is, the robot preferably travels to the second location after being requested to do so by a vending terminal and this request being transmitted to the server, and the server commanding the mobile robot to travel to the second location.

In some such embodiments, the method can further comprise, before the mobile robot travelling to the second location, the server directing the mobile robot to travel to the second location.

In some such embodiments, the method can further comprise the vending terminal requesting access to the robot's item space to the server and the server commanding the mobile robot to allow access to the item space. That is, when the user meets the robot at the second location, the user can indicate so and request for the robot to be unlocked, so that the user can obtain access to the consumable items. It can be preferred for the robot to be locked while idle and/or travelling, so that unauthorized persons do not obtain access to the robot's consumable items.

In some such embodiments, the vending terminal and the mobile robot can be at the second location when access to the item space is requested. That is, the user can preferably request to access the consumable items after meeting the robot.

In some embodiments, the method can further comprise the mobile robot communicating to the server which items have been removed, and the server communicating to the vending terminal which consumable items have been removed and their cost. That is, the robot can use the item sensor to detect specifically which items the user removed while granted access to the item space, and forward this information to the server. The server can then present the user with a list of the removed items and their cost. This can be preferably done via an interface such as an app installed on the user's vending terminal. Note, that in embodiments where the robot comprises a removable insert comprising the item sensor and a separate communication component from the robot's, the insert can forward the item sensor's data to the server. This is also included herein under the "robot communicating with the server".

In some embodiments, the method can further comprise using the item sensor to detect consumable items that have been returned to the support elements after being removed. For example, a user may withdraw a consumable item from the mobile robot, but the change their mind and return it. In this case, the item sensor can detect this. In some such embodiments, the method can further comprise communicating to the vending terminal an updated list of removed consumable items and their cost after the item sensor detects that some consumable items have been returned to the support elements. That is, the user would not be charged for a consumable item they withdrew, but then returned to the support elements of the robot.

In some embodiments, the item sensor can comprise a capacitive based sensor that can detect the removed items by measuring a change in capacitance of the capacitive sensor resulting from the removal of the consumable items from the support elements.

In some embodiments, the item sensor can comprise an infrared sensor that can detect the removed items by measuring a change in light reflected off the consumable items resulting from their removal from the support elements.

In some embodiments, the mobile robot can further comprise a second item sensor, and the method can further comprise, after allowing access to the item space, using the second item sensor to detect at least one of different consumable items supported by different support elements, and items different from the consumable items supported by the support elements. As explained before, this can be useful for detecting that a user returned a consumable item to a different support element and/or that the user placed a different item (such as a bottle of water instead of a soft drink or a rock instead of a chocolate bar) on the support element.

In a fourth embodiment, the invention discloses a method for on-demand consumable item delivery by a mobile robot. The method comprises loading at least one mobile robot with a plurality of consumable items at a first location. The method also comprises using a vending terminal to request the mobile robot to travel to a second location. The method further comprises the mobile robot travelling to the second location. The method also comprises using the vending terminal to request access to the consumable items. The method further comprises the mobile robot allowing access to the consumable items. The method also comprises the mobile robot detecting consumable item or consumable items that have been removed. The method further comprises communicating to the vending terminal which consumable items have been removed and their cost.

The robot, server and vending terminal can be as described above and below in the embodiments and in the figures.

In some embodiments, the method can further comprise the mobile robot detecting consumable items that have been returned to the mobile robot, and communicating to the vending terminal an updated list of the removed consumable items and their cost. As described above, this is advantageous, as it prevents the user operating the vending terminal and wishing to purchase items from the mobile robot from being charged for a consumable item that they looked at, but returned to the robot's item space.

In some embodiments, the method can further comprise loading at least two mobile robots with a plurality of different consumable items at a first location and the vending terminal selecting the desired at least one consumable item from a plurality of different consumable items before requesting the mobile robot carrying the desired consumable item to travel to the second location. In other words, there can be a plurality of mobile robots acting as on-demand vending machines loaded with different items. The user can then choose one of these robots via the vending terminal based on the items it carries and/or on its estimated time of arrival to the user's location and/or to the second location.

The present invention is also defined by the following numbered embodiments.

Below is a list of device embodiments. Those will be indicated with a letter "A". Whenever such embodiments are referred to, this will be done by referring to "A" embodiments.

A1. A mobile robot (1) configured for vending consumable items (100), the mobile robot comprising
a mobile base (4); and
a body (2) comprising an item space (22); and
  a plurality of support elements (12) located in the item space (22) and configured to support consumable items (100); and
  an item sensor (30) configured to detect the presence of the consumable items (100) supported by each of the support elements (12).

A2. A mobile robot (1) according to the preceding embodiment further comprising at least one insert (10) configured to removably fit into the item space (22) and wherein the insert (10) comprises the support elements (12) and the item sensor (30).

A3. The mobile robot (1) according to the preceding embodiment wherein the insert (10) comprises a top surface and wherein the support elements (12) comprise indentations located in the top surface of the insert (10).

A4. The mobile robot (1) according to any of the preceding embodiments wherein the item sensor (30) comprises a capacitive sensor (30).

A5. The mobile robot (1) according to the preceding embodiment wherein the item sensor (30) comprises a base plate (324) and a plurality of pads (322) and wherein
  each of the pads (322) comprises a conductive plate with the base plate (324) serving as a second conductive plate for all of the pads; and each of the pads (322) is configured to be placed below each of the support elements (12).

A6. The mobile robot (1) according to any of the preceding embodiments further comprising a lid (24) configured to cover the item space (22).

A7. The mobile robot (1) according to the preceding embodiment wherein the mobile robot (1) further comprises a lid sensor (16) configured to detect whether the lid (24) is open or closed.

A8. The mobile robot (1) according to the preceding embodiment wherein the item sensor (30) only activates when the lid sensor (16) detects that the lid (24) is open.

A9. The mobile robot (1) according to any of the two preceding embodiments wherein the lid sensor (16) comprises an infrared proximity sensor.

A10. The mobile robot (1) according to any of the preceding embodiments further comprising a second item sensor (60) configured to detect at least one of different consumable items (100) supported by different support elements (12); and
  items different from the consumable items (100) supported by the support elements (12).

A11. The mobile robot (1) according to the preceding embodiment wherein the second sensor (60) comprises a visual camera.

A12. The mobile robot (1) according to any of the two preceding embodiments and with the features of embodiment A6, wherein the second sensor (60) is placed on the side of the lid (24) facing the item space (22).

A13. The mobile robot (1) according to any of the embodiments A10 and A11 and with the features of embodiment A2 wherein the second sensor (60) is placed on the bottom side of the insert (10).

Below is a list of system embodiments. Those will be indicated with a letter "S". Whenever such embodiments are referred to, this will be done by referring to "S" embodiments.

S1. A system configured for vending consumable items, the system comprising
  a mobile robot (1) comprising
    a mobile base (4); and
    a body (2) comprising an item space (22); and
    a plurality of support elements (12) configured to support items (100); and
    an item sensor (30) configured to detect the presence of the consumable items (100) supported by each of the support elements (12); and
  a server (200);
  and a vending terminal (300); and
    wherein the server (200) is configured to communicate with the mobile robot (1) and the vending terminal (300).

S2. The system according to the preceding embodiment wherein the mobile robot further comprises a communication component configured to communicate with the server.

S3. The system according to the preceding embodiment wherein the communication component comprises at least one of a modem and a SIM card.

S4. The system according to any of the preceding system embodiments wherein the vending terminal (300) comprises a personal electronic device.

S5. The system according to the preceding embodiment wherein the vending terminal (300) comprises at least one of a smartphone, a tablet, a wearable device, and/or a laptop.

S6. The system according to any of the preceding system embodiments wherein the mobile robot (1) is configured to allow access to its item space (22) based on a command from the server (200).

S7. The system according to the preceding embodiment wherein the server (200) is configured to command the mobile robot (1) to allow access to its item space (22) based on a request from the vending terminal (300).

S8. The system according to any of the two preceding embodiments wherein the item sensor (30) is configured to detect consumable items (100) removed from the support elements (12) while access is allowed to the item space (22).

S9. The system according to the preceding embodiment wherein the robot (1) is configured to communicate which consumable items (100) have been removed from the support elements (12) as detected by the item sensor (30) to the server (200), and the server (200) is configured to communicate to the vending terminal (300) which consumable items (100) have been removed and their cost.

S10. The system according to any of the preceding system embodiments wherein the item sensor (30) is further configured to detect any consumable items (100) returned to the support elements (12) after being removed.

S11. The system according to the preceding embodiment and with the features of embodiment S9 wherein the robot (1) is further configured to communicate which consumable items (100) have been returned to the support elements (12) after being removed to the server (200), and the server (200) is configured to communicate to the vending terminal (300) an updated list of removed consumable items (100) and their cost.

Below is a list of method embodiments. Those will be indicated with a letter "M". Whenever such embodiments are referred to, this will be done by referring to "M" embodiments.

M1. A method for vending consumable items using a mobile robot (1), the method comprising
providing the mobile robot (1) comprising
a mobile base (4); and
a body (2) comprising an item space (22); and
a plurality of support elements (12) configured to support items (100); and
an item sensor (30) configured to detect the presence of the consumable items (100) supported by each of the support elements (12);
loading the support elements (12) of the mobile robot (1) with a plurality of consumable items (100) at a first location; and
the mobile robot (1) travelling to a second location; and
allowing access to the consumable items (100) in the item space (22) of the mobile robot (1) at the second location; and
the mobile robot detecting which consumable items (100) have been removed from the support elements (12) using the item sensor (30).

M2. The method according to the preceding embodiment further comprising providing a server (200) and a vending terminal (300) wherein
the server (200) is configured to communicate with the mobile robot (1) and the vending terminal (300).

M3. The method according to the preceding embodiment further comprising, before the mobile robot (1) travelling to the second location,
the vending terminal (300) requesting the mobile robot (1) to travel to the second location by communicating with the server (200).

M4. The method according to the preceding embodiment further comprising, before the mobile robot (1) travelling to the second location,
the server (300) directing the mobile robot (1) to travel to the second location.

M5. The method according to any of the preceding three embodiments further comprising the vending terminal (300) requesting access to the robot's item space (22) to the server (200) and the server (200) commanding the mobile robot (1) to allow access to the item space (22).

M6. The method according to the preceding embodiment wherein the vending terminal (300) and the mobile robot (1) are at the second location when access to the item space (22) is requested.

M7. The method according to any of the preceding four embodiments further comprising the mobile robot communicating to the server (200) which items (100) have been removed, and the server (200) communicating to the vending terminal (300) which consumable items (100) have been removed and their cost.

M8. The method according to any of the preceding method embodiments further comprising using the item sensor (30) to detect consumable items (100) that have been returned to the support elements (12) after being removed.

M9. The method according to the preceding embodiment and with the features of embodiment M7 further comprising communicating to the vending terminal (300) an updated list of removed consumable items (100) and their cost after the item sensor (30) detects that some consumable items (100) have been returned to the support elements (12).

M10. The method according to any of the preceding method embodiments wherein the item sensor (30) comprises a capacitive based sensor and wherein it detects the removed items by measuring a change in capacitance of the capacitive sensor resulting from the removal of the consumable items (100) from the support elements (12).

M11. The method according to any of the preceding method embodiments wherein the item sensor (30) comprises an infrared sensor and wherein it detects the removed items by measuring a change in light reflected off the consumable items (100) resulting from their removal from the support elements (12).

M12. The method according to any of the preceding method embodiments wherein the mobile robot (1) further comprises a second item sensor (60), and wherein the method further comprises, after allowing access to the item space (22), using the second item sensor (60) to detect at least one of
different consumable items (100) supported by different support elements (12); and
items different from the consumable items (100) supported by the support elements (12).

M13. A method for on-demand consumable item (100) delivery by a mobile robot (1), the method comprising
loading at least one mobile robot (1) with a plurality of consumable items (100) at a first location;
using a vending terminal (300) request the mobile robot (1) to travel to a second location;
the mobile robot (1) travelling to the second location;
using the vending terminal (300) to request access to the consumable items (100) the mobile robot (1) allowing access to the consumable items (100);
the mobile robot (1) detecting consumable item (100) or consumable items (100) that have been removed;
communicating to the vending terminal (300) which consumable items (100) have been removed and their cost.

M14. The method according to the preceding embodiment further comprising
the mobile robot (1) detecting consumable items (100) that have been returned to the mobile robot (1); and
communicating to the vending terminal (300) an updated list of the removed consumable items (100) and their cost.

M15. The method according to any of the preceding two embodiments further comprising loading at least two mobile robots (1) with a plurality of different consumable items (100) at a first location and the vending terminal selecting the desired at least one consumable item (100) from a plurality of different consumable items (100) before requesting the mobile robot (1) carrying the desired consumable item (100) to travel to the second location.

M16. The method according to any of the preceding two embodiments wherein the mobile robot (1) is according to any device embodiments A1 to A13.

The present technology will now be discussed with reference to the accompanying drawings.

DESCRIPTION OF EMBODIMENTS

Figure 1:
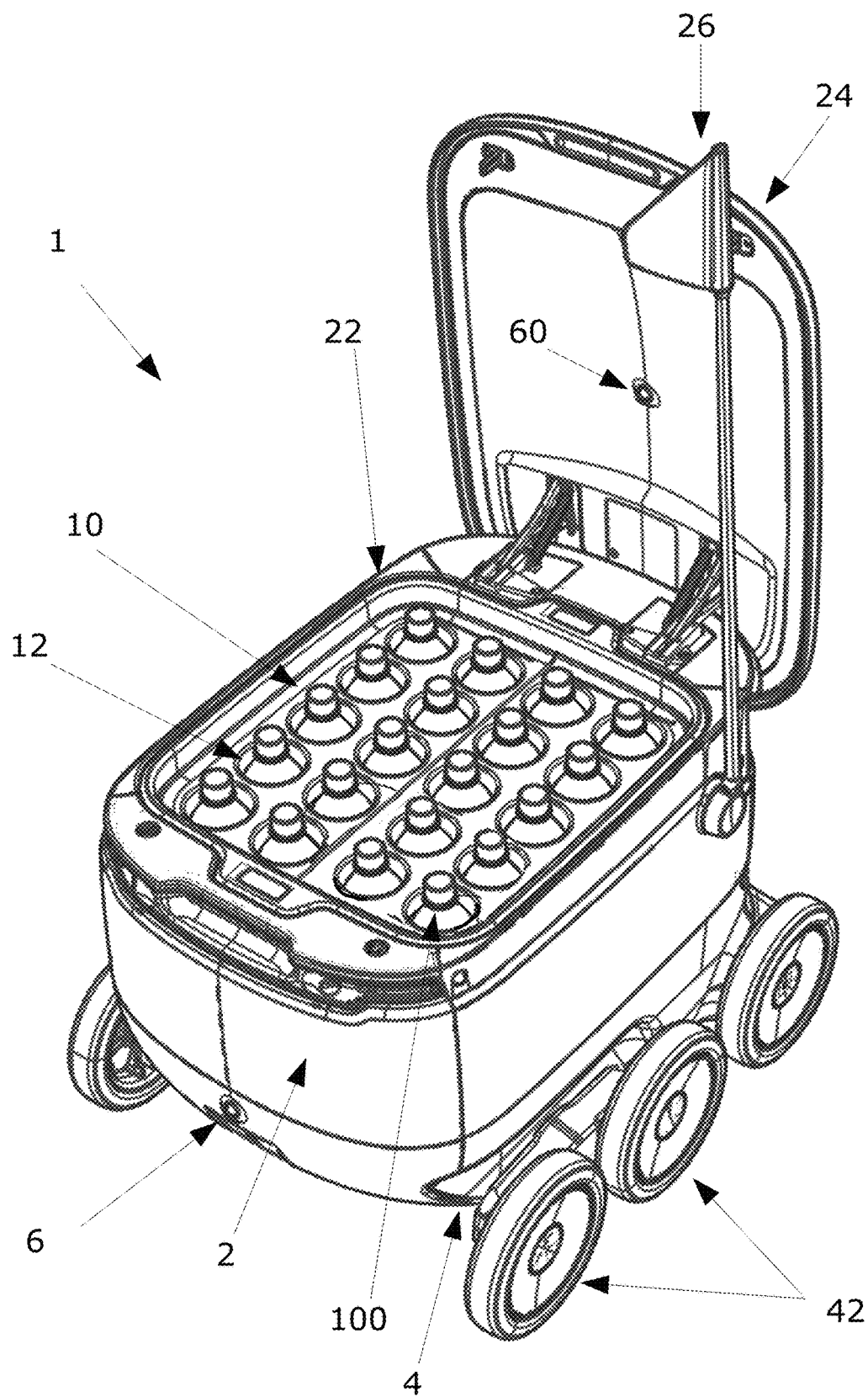
FIG. 1 depicts an embodiment of a mobile robot 1 configured to carry consumable items.

FIG. 1 schematically depicts an embodiment of a mobile robot 1 configured to carry consumable items. The mobile robot 1 can comprise a robot configured to travel on the ground. The mobile robot 1 can comprise a mobile frame 4. The frame 4 can comprise the base on the robot with wheels 42 mounted on it. The robot 1 preferably can comprise six wheels 42, but anywhere from two to ten wheels is also possible. The robot 1 also comprises a body 2, preferably mounted on top of the mobile frame 4. The body 2 can comprise an item space 22. The item space 22 can be a hollow space surrounded by the body 2 except for the top opening. However, in other, not depicted embodiments, the item space 22 can also not be entirely enclosed by the body 2, but have one or more open sides. A lid 24 can be configured to cover the top of the item space 22, so that any items 100 stored and transported within the item space 22 are not visible. The lid 24 can also comprise a lock, configured to be locked and unlocked electronically and ensure that no unauthorized persons access the item space 22. The mobile robot 1 can also further comprise a signaling device 26. The signaling device 26 can comprise a flag or an antenna. It can be used to increase the visibility of the mobile robot 1 as it traverses outdoor environments.

The mobile robot 1 can also comprise a plurality of situational awareness sensors 6. Such sensors 6 can comprise visual cameras, ultrasonic sensors, time of flight cameras, Lidar sensors, and other similar sensors. They can be configured to allow the mobile robot 1 to sense its surroundings and to make different navigational or other decisions based on that. In addition to that, the mobile robot 1 preferably comprises purely "navigational" sensors (not shown in the figure) such as accelerometers, GPS sensors, altitude sensors, dead reckoning sensors and other similar sensors.

The mobile robot 1 can further comprise an insert 10 that can be configured to fit is into the robot's item space 22. The insert 10 can comprise support elements 12. For example, support elements 12 can comprise cavities or depressions. The support elements 12 are configured to support items 100. Preferably, each support element 12 is configured to support one item 100. The insert 10 preferably comprises a plurality of support elements 12, such as between eight and forty support elements 12, preferably between ten and thirty support elements 12.

The mobile robot 1 as described in the present disclosure can be used for carrying a plurality of consumable items 100 that can be purchased. In other words, the robot 1 can act as a smart and mobile vending machine. In one example, the robot 1 (or a plurality of robots) can remain stationary at a key location or travel around a certain location or territory (such territory can comprise, for example, a park, a campus, a public space, or a similar environment) until requested by a customer to arrive to a specific location. The request can be done, for example, via an electronic application on a personal device (such as an app on a smartphone, tablet or another personal electronic device). Such an exemplary electronic application is discussed in more detail in the description to FIGS. 8(a)-8(u).

The prospective customer can see, via the electronic application, which consumable items 100 the robot 1 carries, and, in case a plurality of robots 1 carrying different consumable items 100 are available in the customer's area, select the appropriate robot with the desired consumable items 100. The customer can then also specify a time and a location at which they would like to meet the robot 1. The robot can then travel to this location, and the customer can access the item space 22 of the robot comprising the insert 12 with the consumable items 100 (for example, by unlocking the electronic lock via the app on a smartphone).

The customer can the remove the consumable item or items 100 that they wish to purchase. The robot 1 can detect which items have been removed (as discussed in more detail in the description to FIGS. 4 and 5), and automatically charge the customer for these items via the electronic application. The robot 1 can then resume its standby mode of either remaining stationary at a specific location (not necessarily the same as previously), or roaming around a certain area.

Also depicted in FIG. 1 is a second item sensor 60. The second item sensor 60 can comprise a camera, such as an image camera. The second item sensor 60 can be placed on the underside of the lid 24, closest to the item space 22. It can also be placed on the underside of the insert 10, facing upwards towards the lid 24. The second item sensor 60 can serve to detect more precisely which items have been removed from the support elements 12 and which items have been placed back. For example, if a user picks up a consumable item 100 from a particular support element 12, and then places it into another one, the second item sensor 60 can detect this. In another example, it can detect it if a user picks up a consumable item 100 and replaces it with another item, such as a user's water bottle in the respective support element 12. The second item sensor 60 can recognize the colors and the logos of the consumable items 100.

Figure 2:
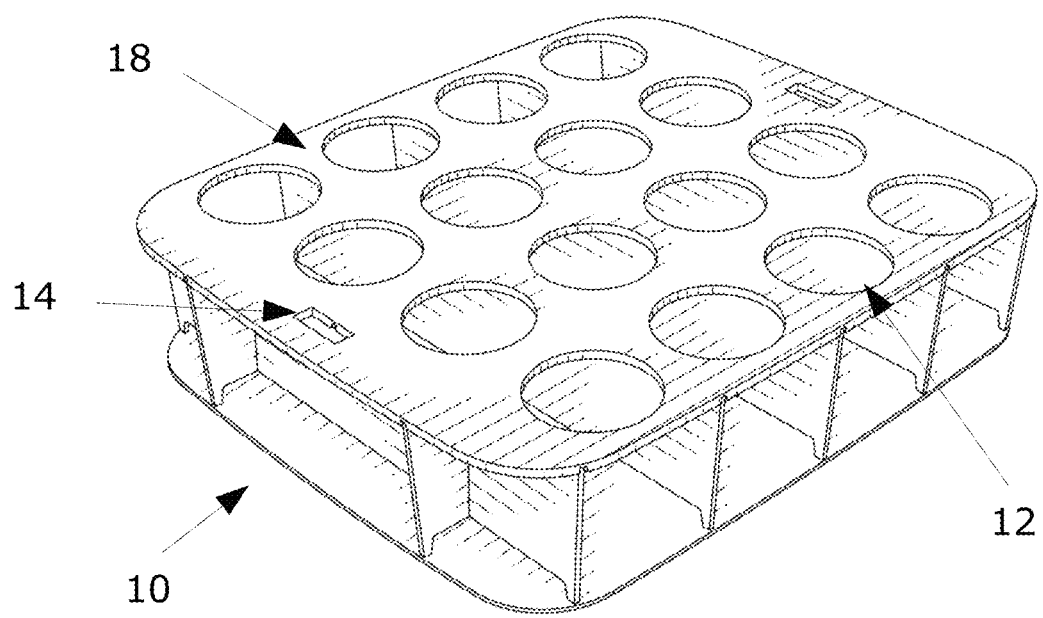
FIG. 2 depicts an embodiment of an insert 10 configured to be fitted into the mobile robot 1.
Figure 6:
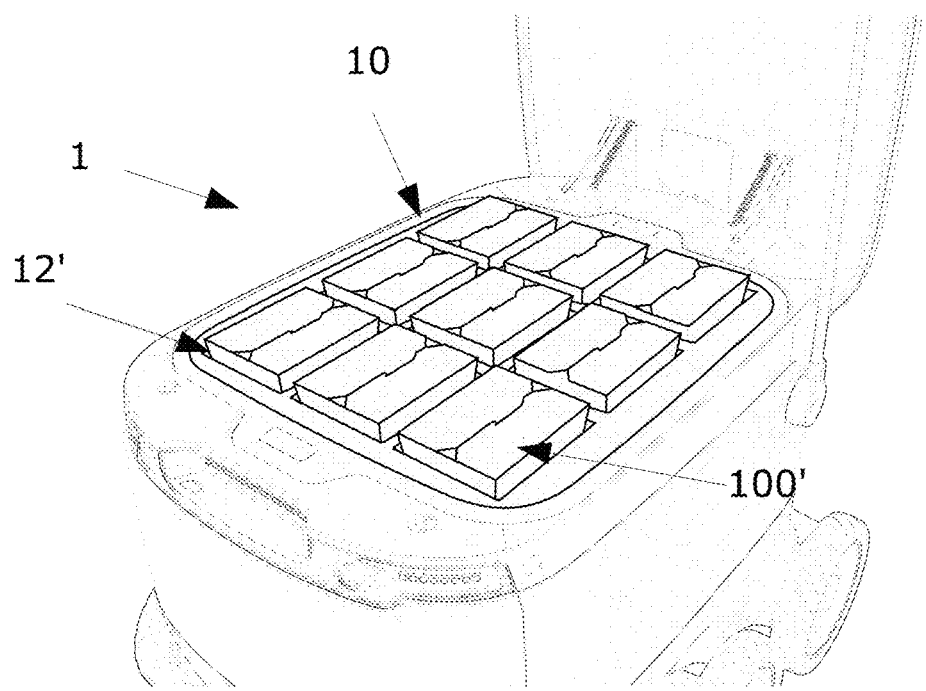
FIG. 6 schematically depicts a different insert 10 fitted within the mobile robot 1.
Figure 7:
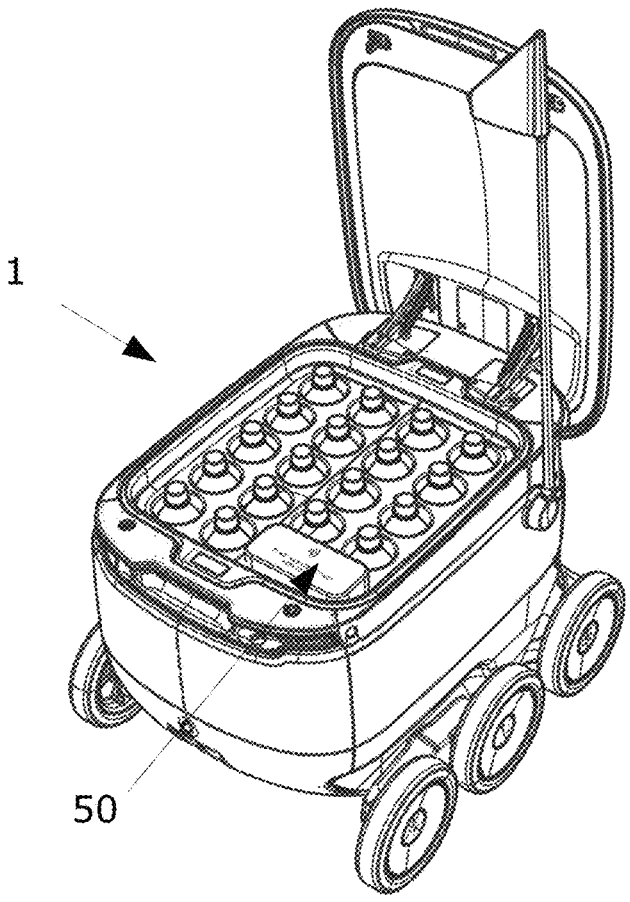
FIG. 7 depicts another embodiment of an insert 10 fitted within the mobile robot 1.

FIG. 2 depicts an embodiments of the insert 10. The depicted insert 10 comprises sixteen support elements 12, shown in the figure as substantially cylindrical indentations 12. Such support elements 12 can be particularly useful for supporting beverages in cans, bottles or cups. The insert 10 can be removably fixed in the robot's item space 22. This can be done, for example, via fixing elements 14. The fixing elements 14 can comprise a solenoid lock that can be unlocked when removing the insert 10 from the item space 22 (but not by the customer wishing to purchase consumable items 100). The insert 10 further comprises a top surface 18. The top surface 18 is preferably a smooth surface comprising the indentations 12. The top surface 18 of the insert 10 is visible when the insert 10 is fixed within the mobile robot 1. The top surface 18 is located closest to the lid 24 of the mobile robot 1 when the insert 10 is fixed within it. The support elements 12 can also comprise a different shape and number, as shown in FIGS. 1, 6 and 7.

Figure 3:
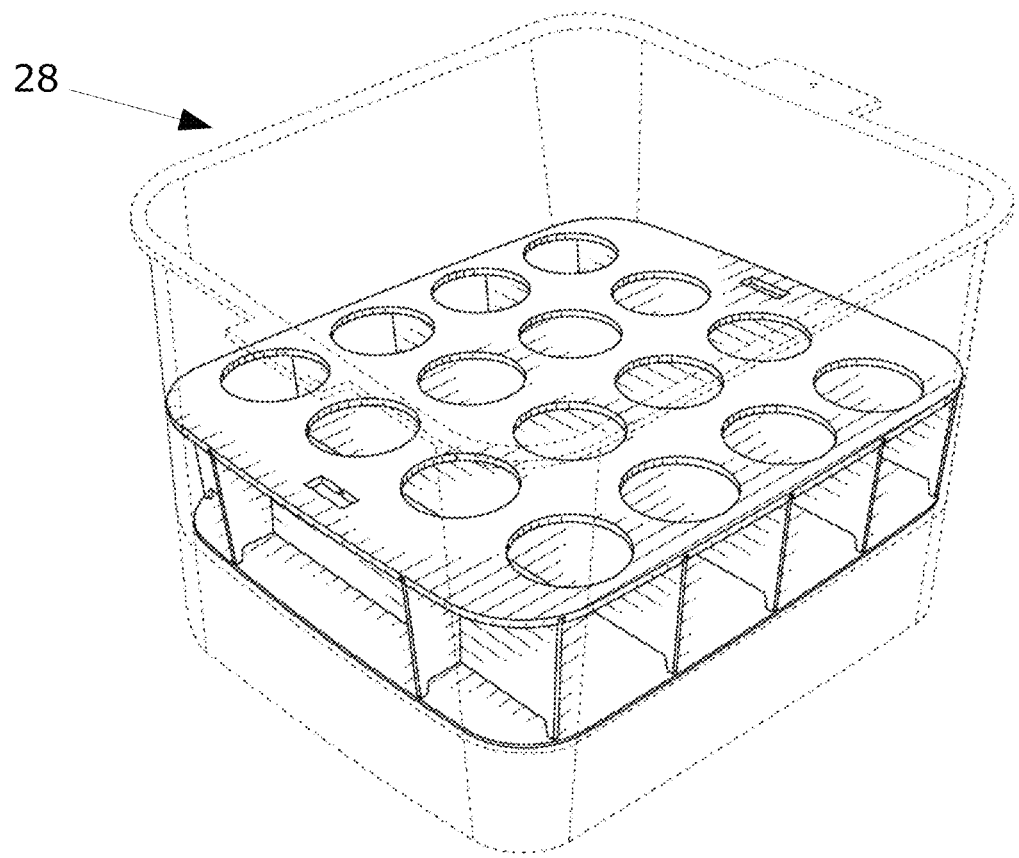
FIG. 3 depicts an embodiment of the insert 10 fitted into a removable basket 28 configured to be fitted into the mobile robot 1.

FIG. 3 depicts the insert 10 placed in a basket 28. The basket 28 is optionally also placed into the item space 22 of the mobile robot 1. The insert 10 is then removably fixed to the basket 28. This can be practical for the cases when the mobile robot 1 is used for other purposes apart from consumable items vending, such as item delivery. In such cases, the removable basket 28 can be a standard basket used with the robot 1, and the insert 10 inserted as needed for vending purposes.

Figure 4:
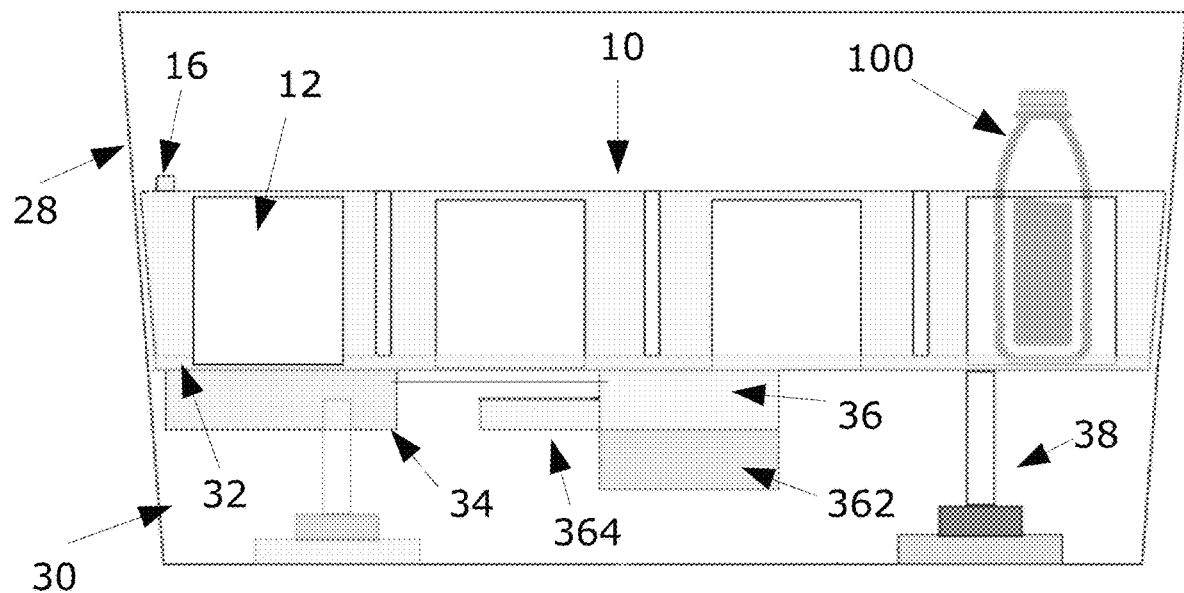
FIG. 4 schematically depicts a side view of the insert 10 fitted within the basket 28.

FIG. 4 schematically depicts an embodiment of the insert 10 placed within the basket 28. As before, the basket 28 is entirely optional. The insert 10 is shown in a side view. The support elements 12 are shown as a cross section. One of the support elements supports (or holds) a consumable item 100, depicted here as a bottle 100. A lid sensor 16 is shown. The lid sensor 16 can detect whether the lid 24 of the robot 1 is open or closed. The lid sensor 16 can be useful, as it can be used to discard any false detection of item removal as the robot 1 travels and is subject to vibration or jolts due to uneven surfaces or acceleration.

FIG. 4 also schematically depicts an embodiment of an item sensor 30. The item sensor 30 can sense the presence of items 100 supported by the support elements 12. The item sensor 30 can comprise one sensor or a plurality of sensors. Preferably, the item sensor 30 comprises one sensor for each support element 12, so that each of the items 100 can be individually sensed by individual item sensors. However, it is also possible that one item sensor 30 is configured to sense each of the items 100 supported by each of the support elements 12 individually. The sensor 30 can comprise different sensors. For example, the item sensor 30 can comprise a capacitive sensor configured to detect changes in separation between conducting plates resulting from the item 100 being removed or placed back into the support element 12. The sensor 30 can also comprise an infrared sensor. In this case, the item sensor 30 can detect changes in the infrared light resulting from the item 100 being removed or placed back into the support element 12.

In the depicted figure, the item sensor 30 is depicted as a capacitive sensor 30. Sensor plate 32 is placed below the support elements 12. The sensor plate 32 comprises a base plate 324 and pads 322, depicted in FIG. 5. The base plate 324 comprise a monolithic plate stretching across the lower part of the insert 10, below all of the support elements 12. The pads 322 are individually placed below each of the support elements 12, so that items 100 removed from each of the support elements 12 can be separately detected. In another embodiment, the capacitive sensor 30 can also comprise individual pads 324 instead of the base plate 324.

Also depicted in FIG. 4 is a plate processor 34, configured to detect changes in the capacitance between the base plate 324 and the pads 322. The plate processor 34 sends this data to a sensor processor 36. The sensor processor 36 is configured to process the data sent by the plate processor 34 and output which items 100 have been removed from the support elements 12. The sensor 30 also comprises a sensor battery 364, configured to provide power to the sensor processor 36. Furthermore, a sensor communication component 364 is configured to send the output of the sensor processor 36 and potentially other relevant data to the mobile robot 1 or to outside sources. Note, that as depicted in the present embodiment, the sensor 30 comprises its own sensor processing component 36. However, the sensor 30 can also be fully integrated with the mobile robot 1 and its inbuilt robot processing component (not depicted).

Finally, a sensor support element 38 is depicted in the figure. The sensor support element 38 can serve to hold the sensor plate 32 up, but can also contribute to dampening vibrations due to the mobile robot 1 moving. The sensor support element 38 can also be optional.

Figure 5:
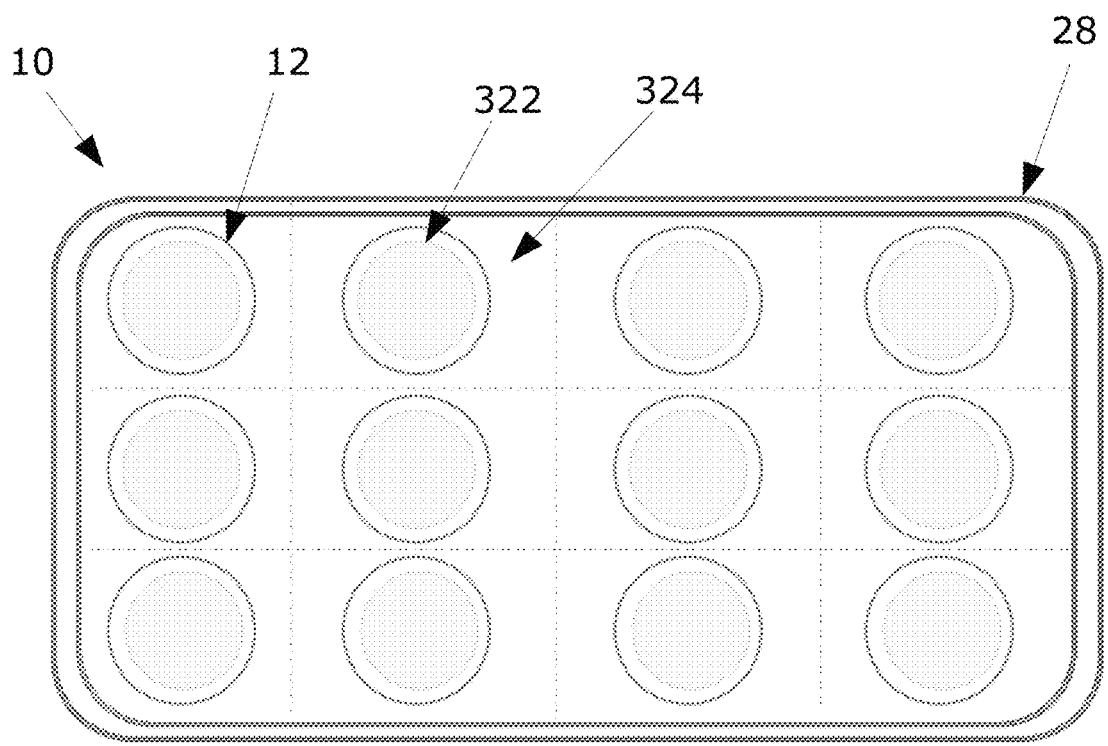
FIG. 5 schematically depicts a top view of the insert 10 fitted within the basket 28.

FIG. 5 depicts a top view of the schematic embodiment of the insert piece 10 place inside the basket 28. Below the support elements 12 shown as indentations, the circular pads 322 are shown. The pads 322 can also comprise a different shape. As discussed before, the pads 322 are placed under each of the support elements 12. The base plate 324 is shown as well.

FIG. 6 depicts another embodiment of the insert piece 10 placed inside the mobile robot 1. The insert piece 10 comprises differently shaped support elements 12'. In the depicted embodiment, the support elements 12' comprise indentations of a substantially rectangular shape. Consumable items 100' comprise containers typically used for take-out food.

FIG. 7 depicts another embodiment of the insert piece 10 placed inside the mobile robot 1. A terminal 50 is depicted as part of the insert piece 10. The terminal 50 can be used to process payments for desired consumable items 100, 100' directly on the mobile robot 1. The terminal 50 can also be connected with the sensor processor 36, so that when certain items 100, 100' are removed from the insert 10, the sensor 30 detects which ones, and the processor 36 conveys the information on how much the customer should be charged via the terminal 50. The terminal 50 can comprise a contactless payment terminal that can accept different methods of payment via card, personal mobile devices, wearables and other devices. The terminal 50 is optional and is only part of one embodiment of the invention.

Figure 8A:
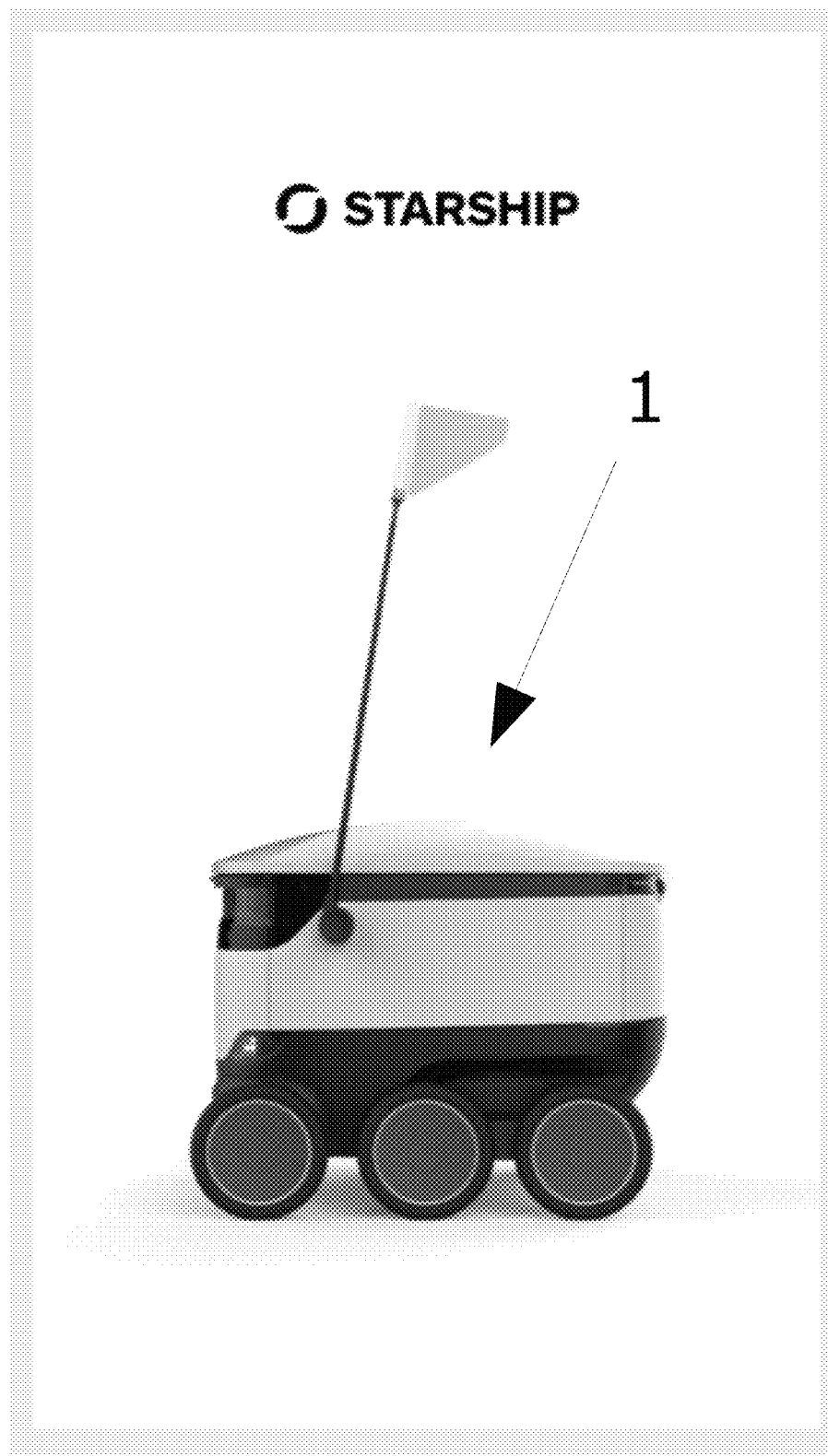
FIGS. 8(a)-8(u) comprise sketches and depict exemplary embodiments of an electronic application configured to enable a user's communication with the mobile robot 1.
Figure 8B:
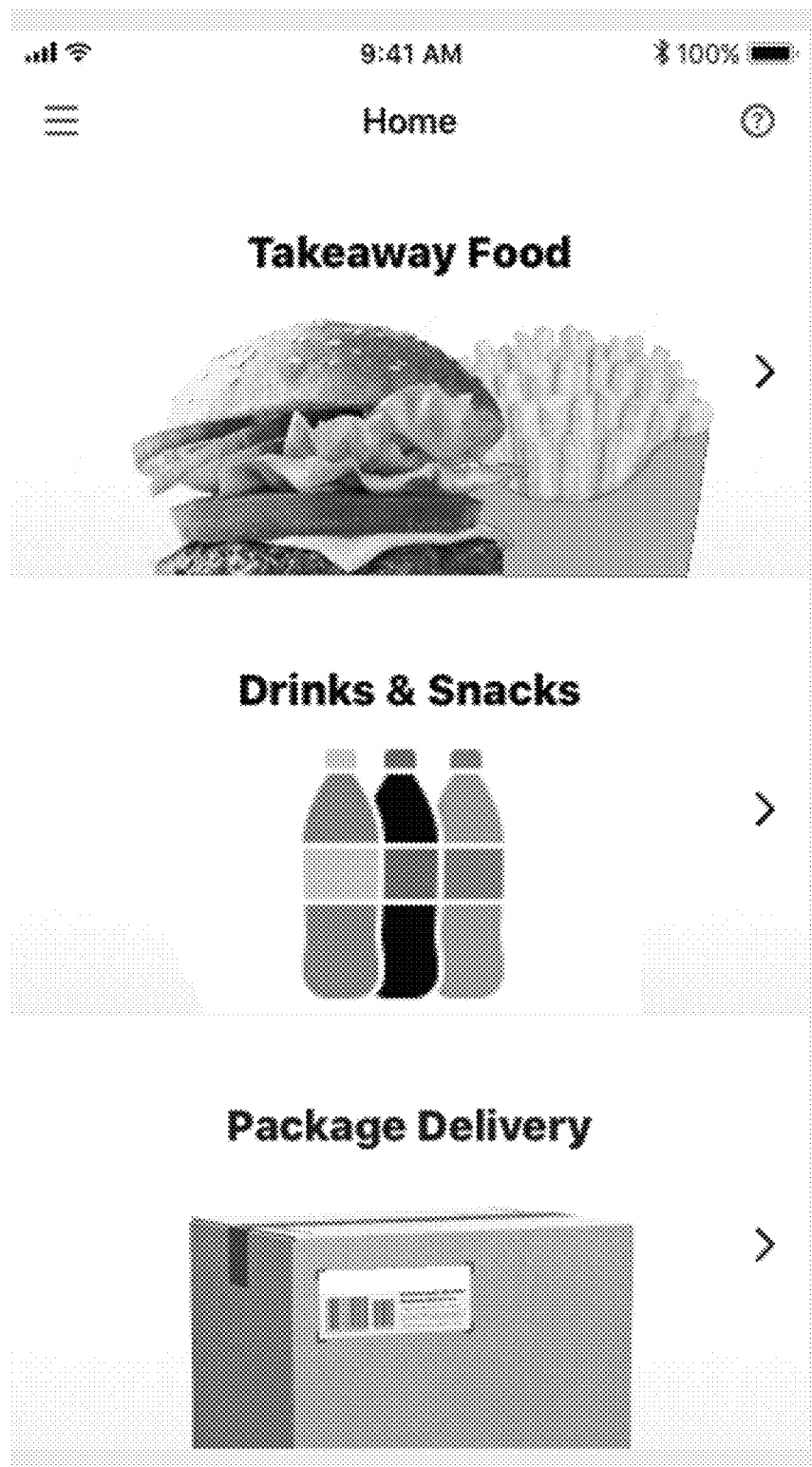
Figure 8C:
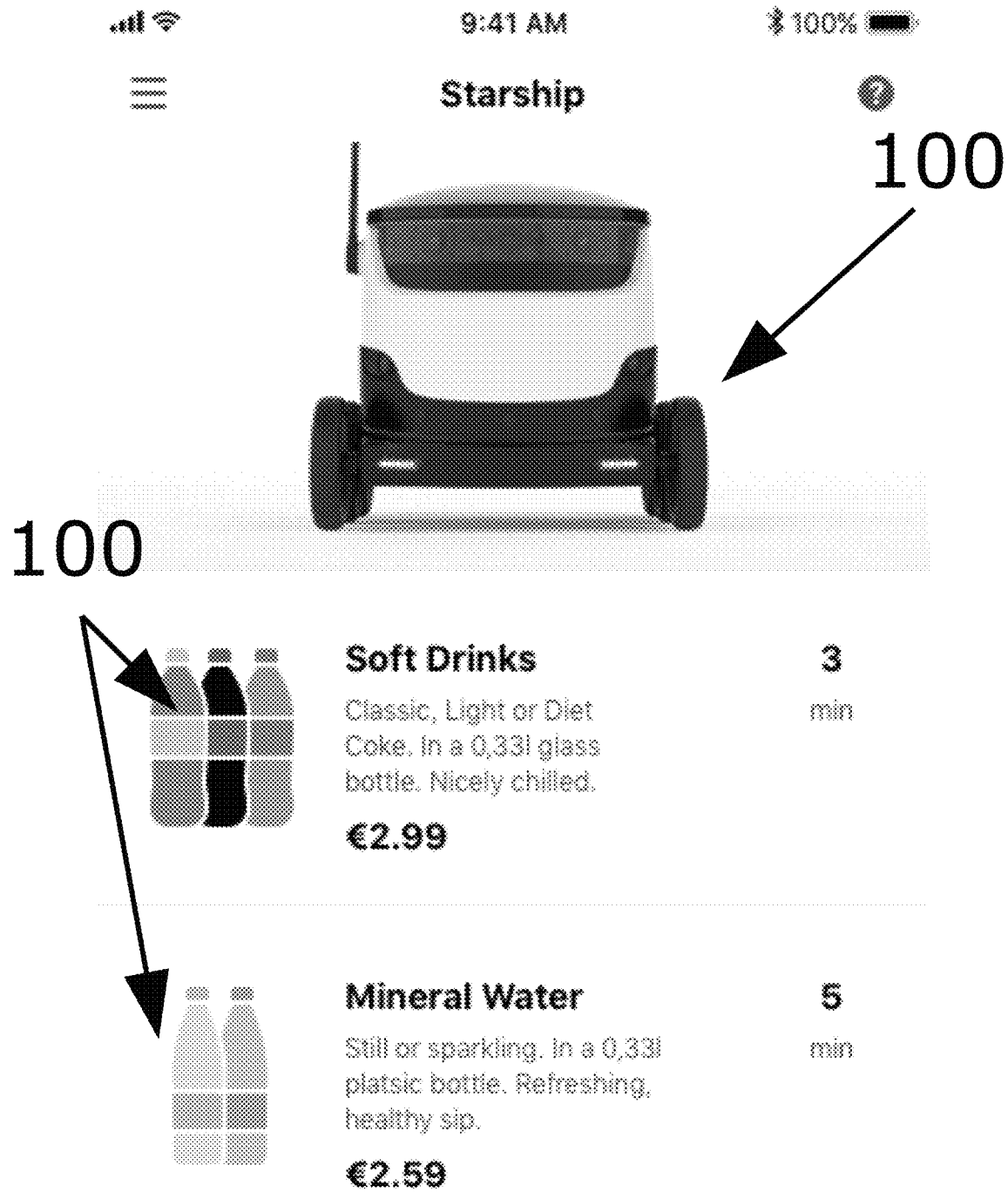
Figure 8D:
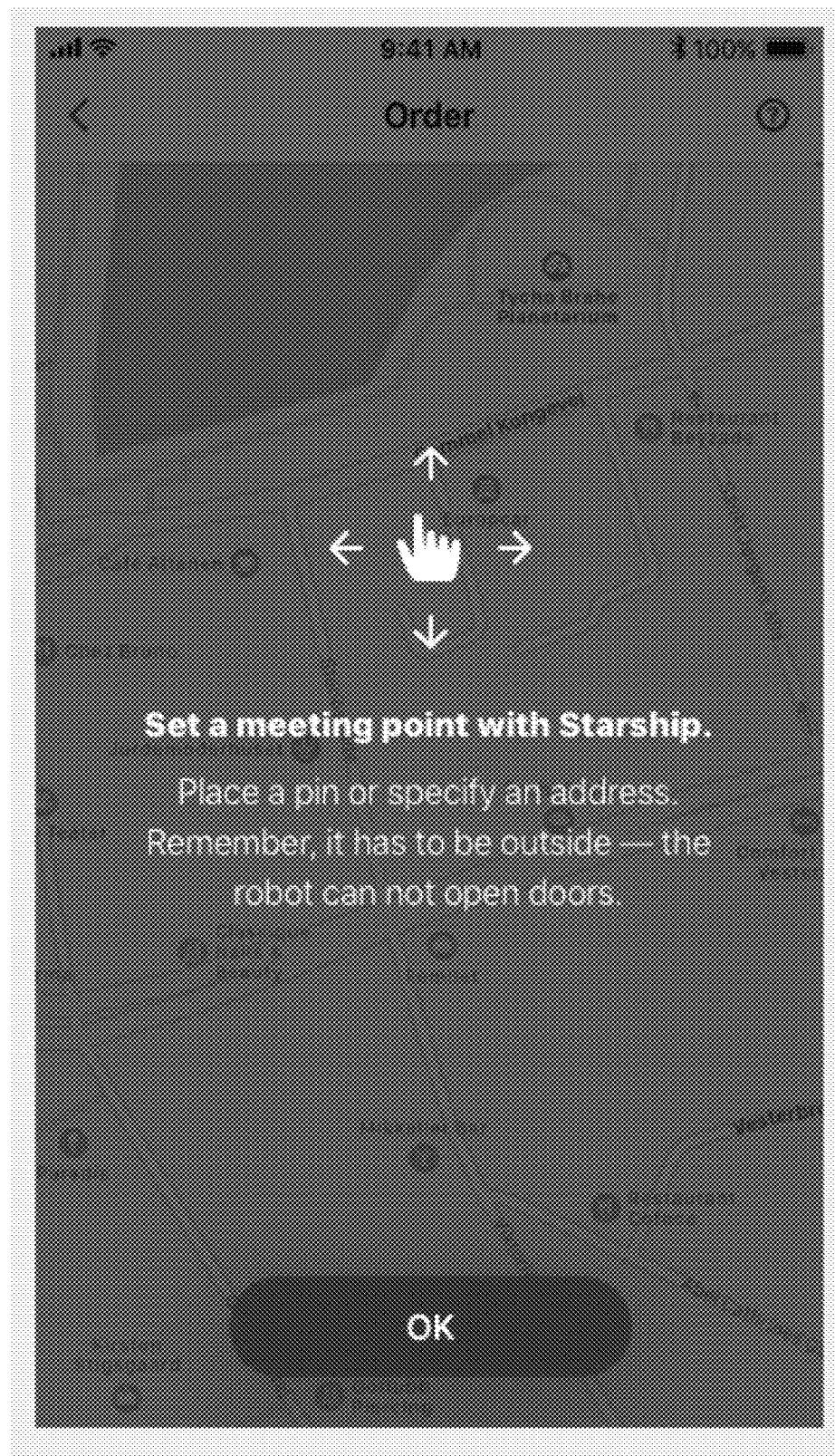
Figure 8E:
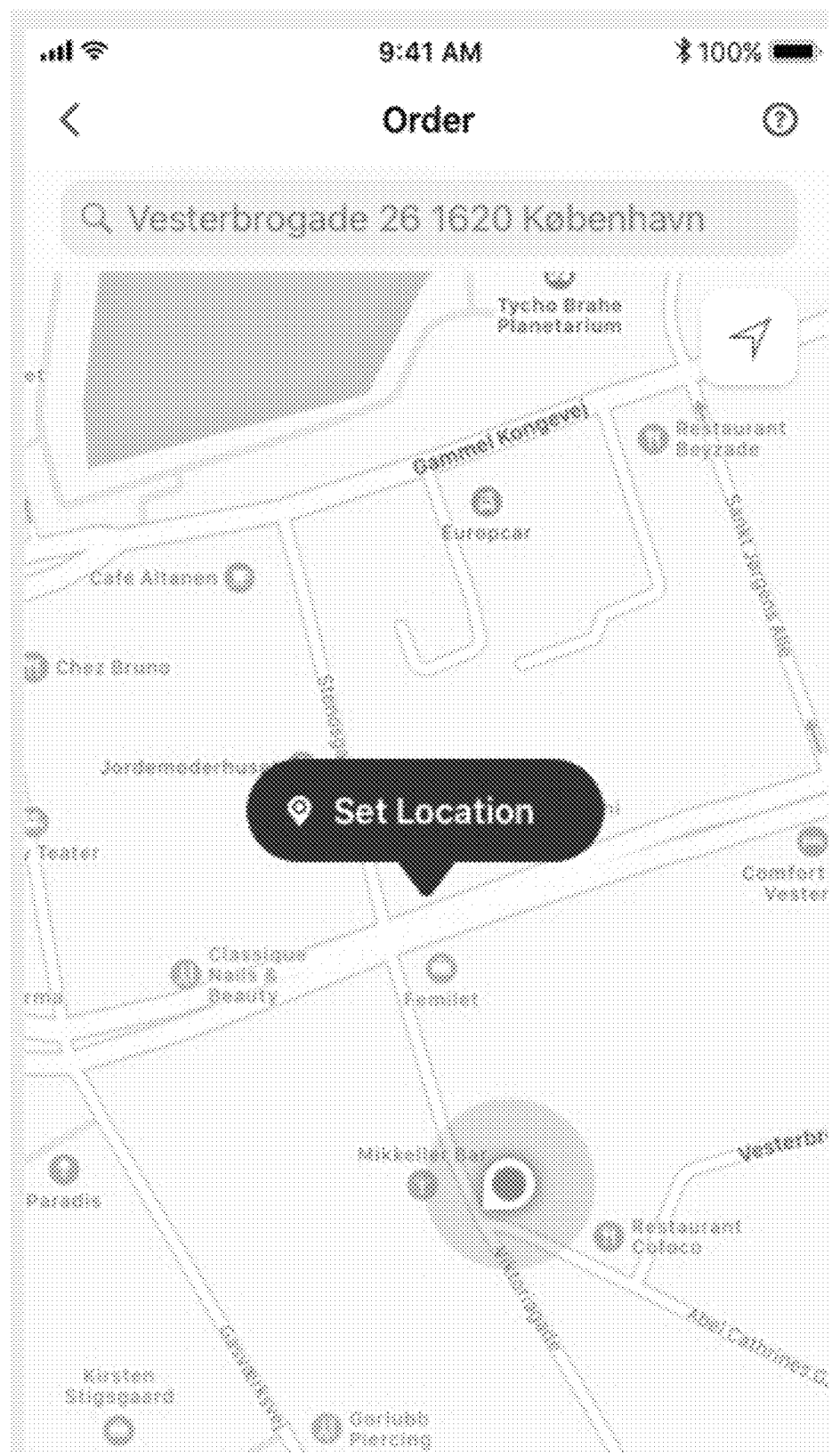
Figure 8F:
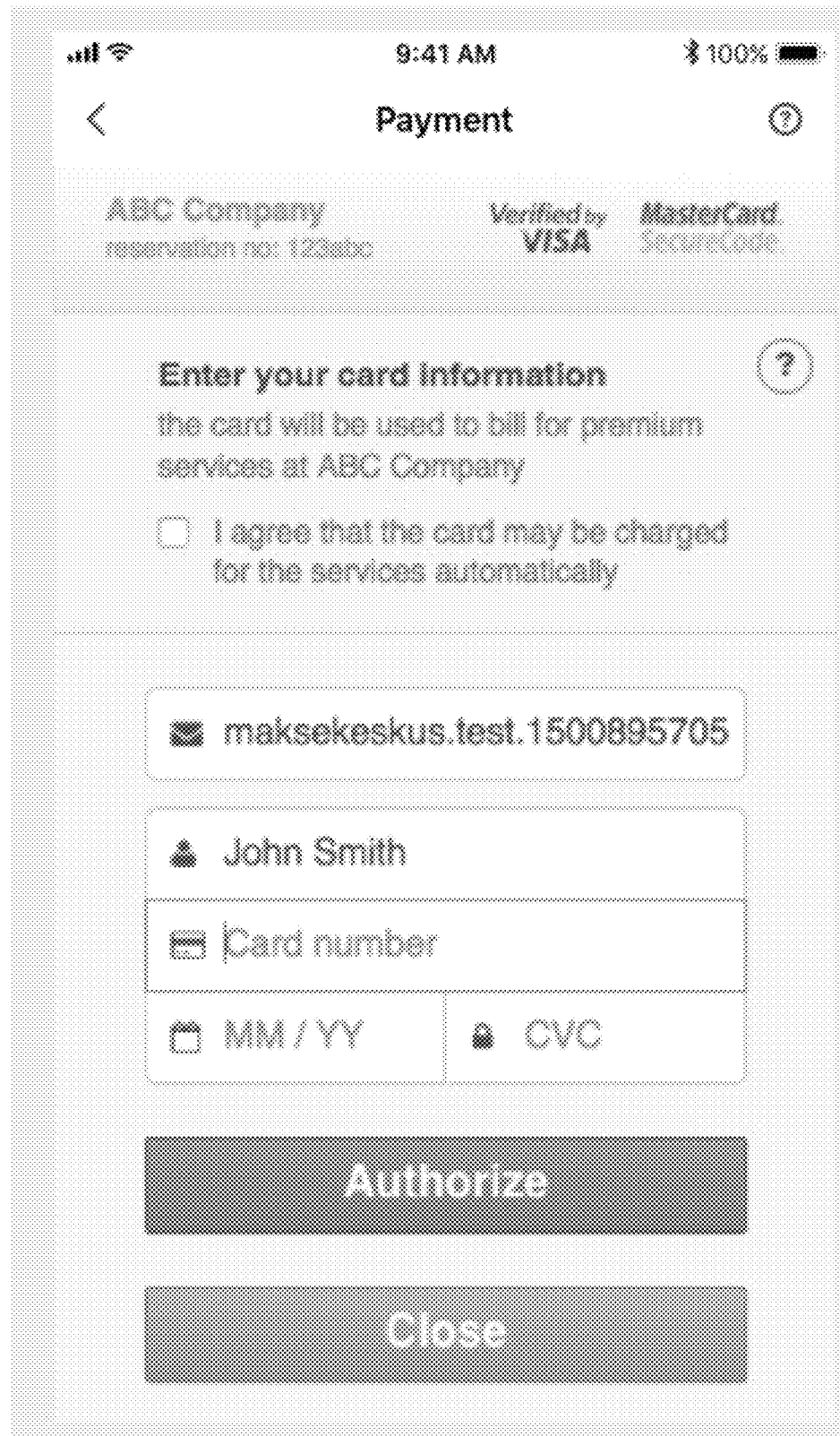
Figure 8G:
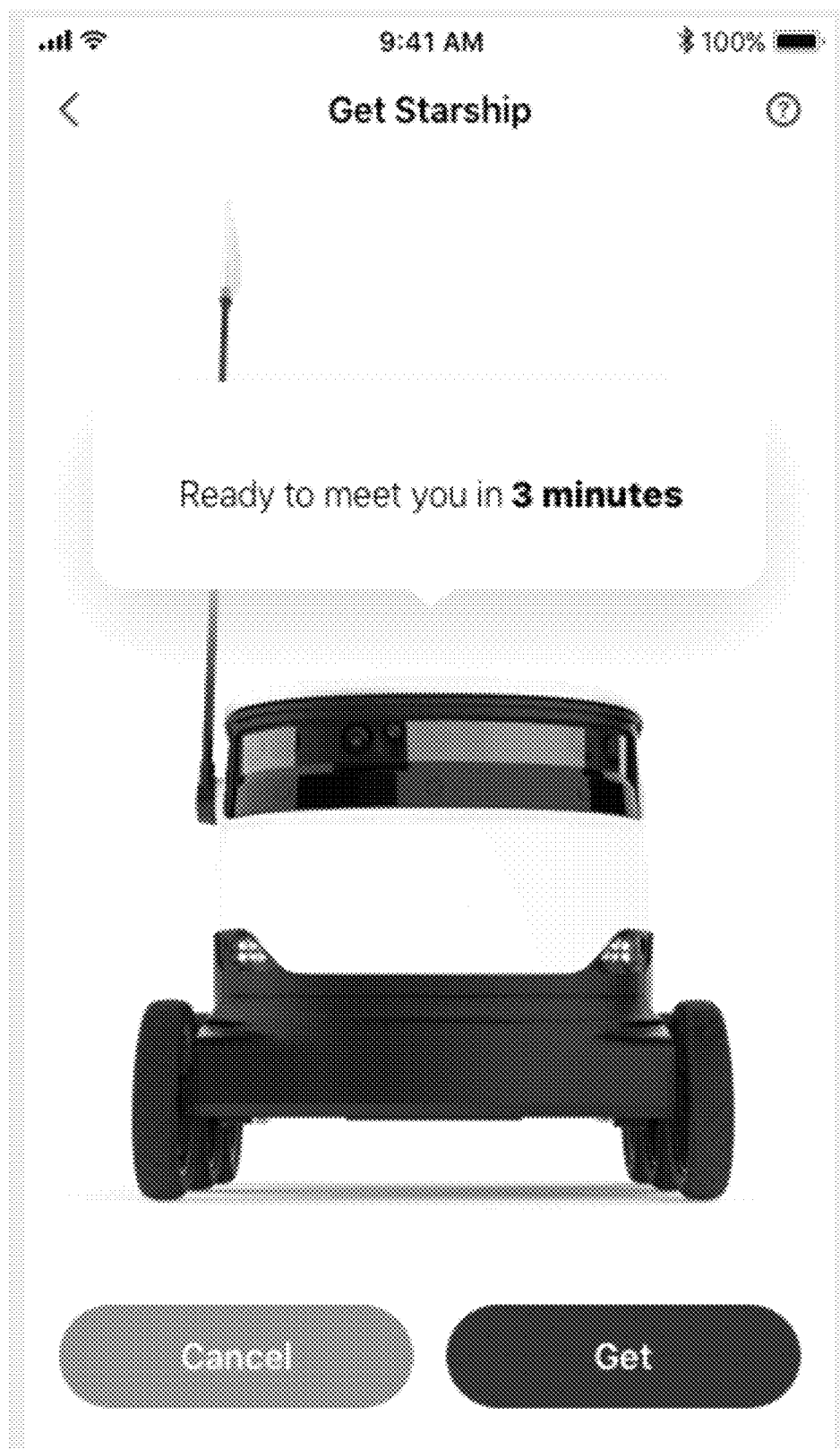
Figure 8H:
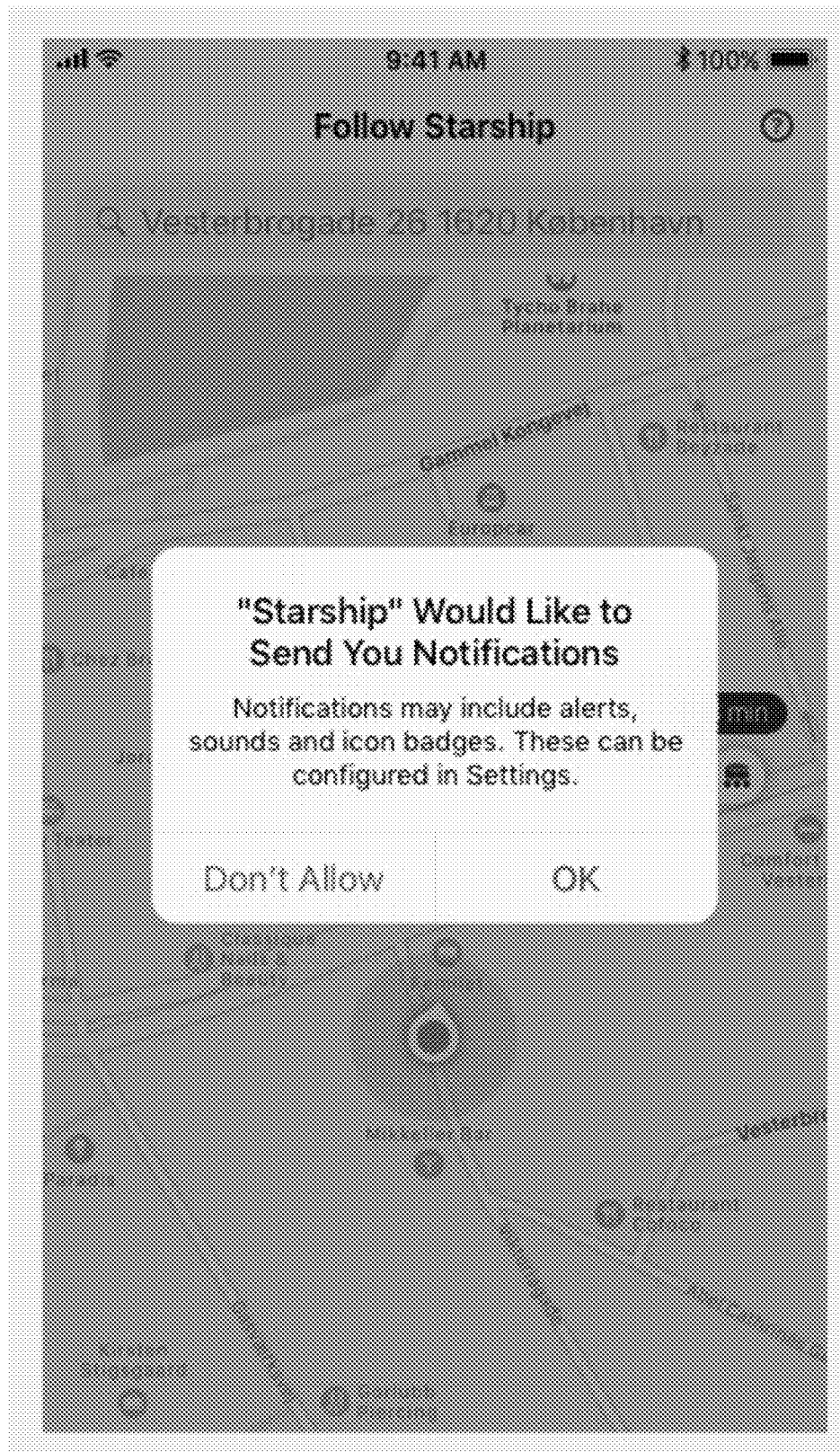
Figure 8I:
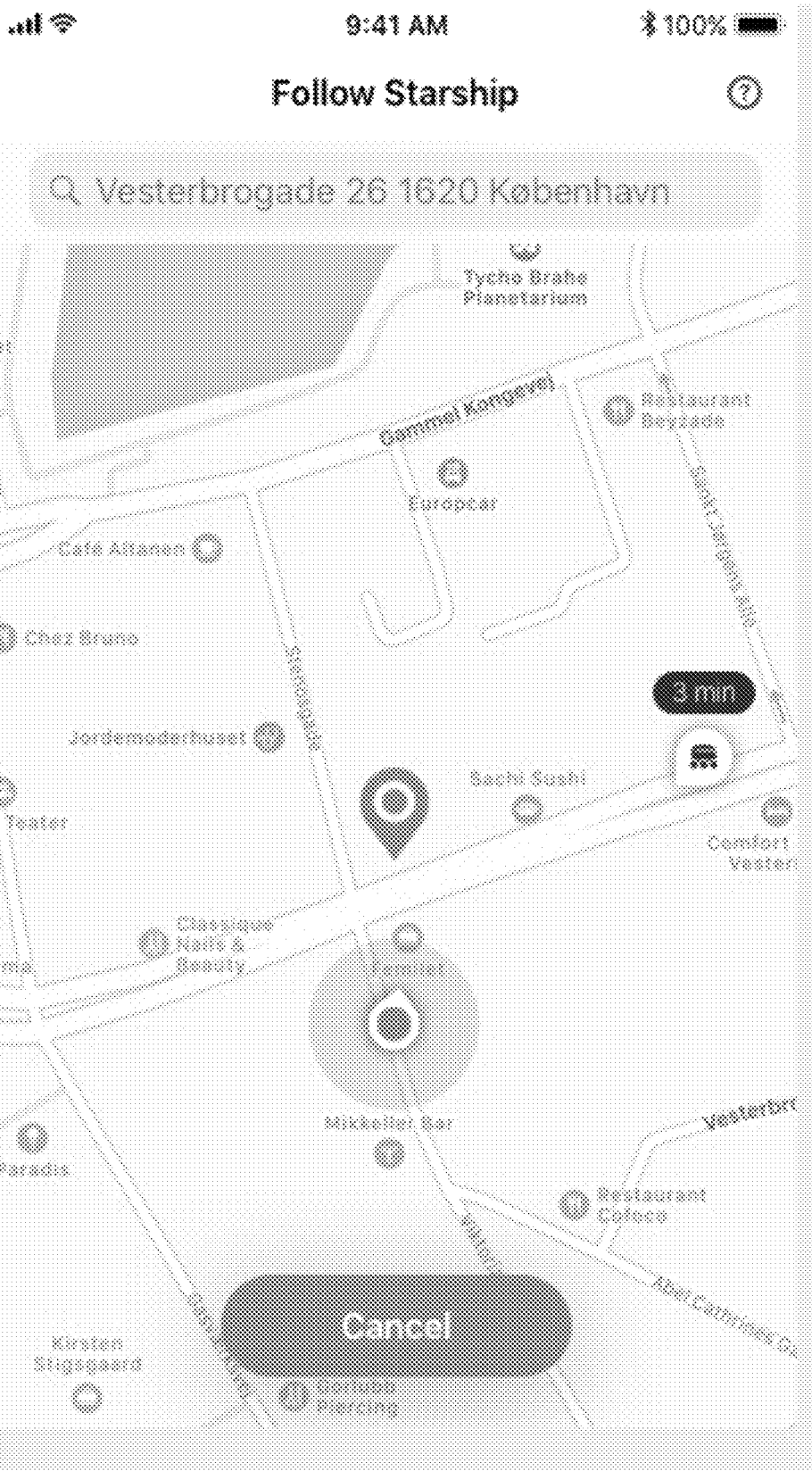
Figure 8J:
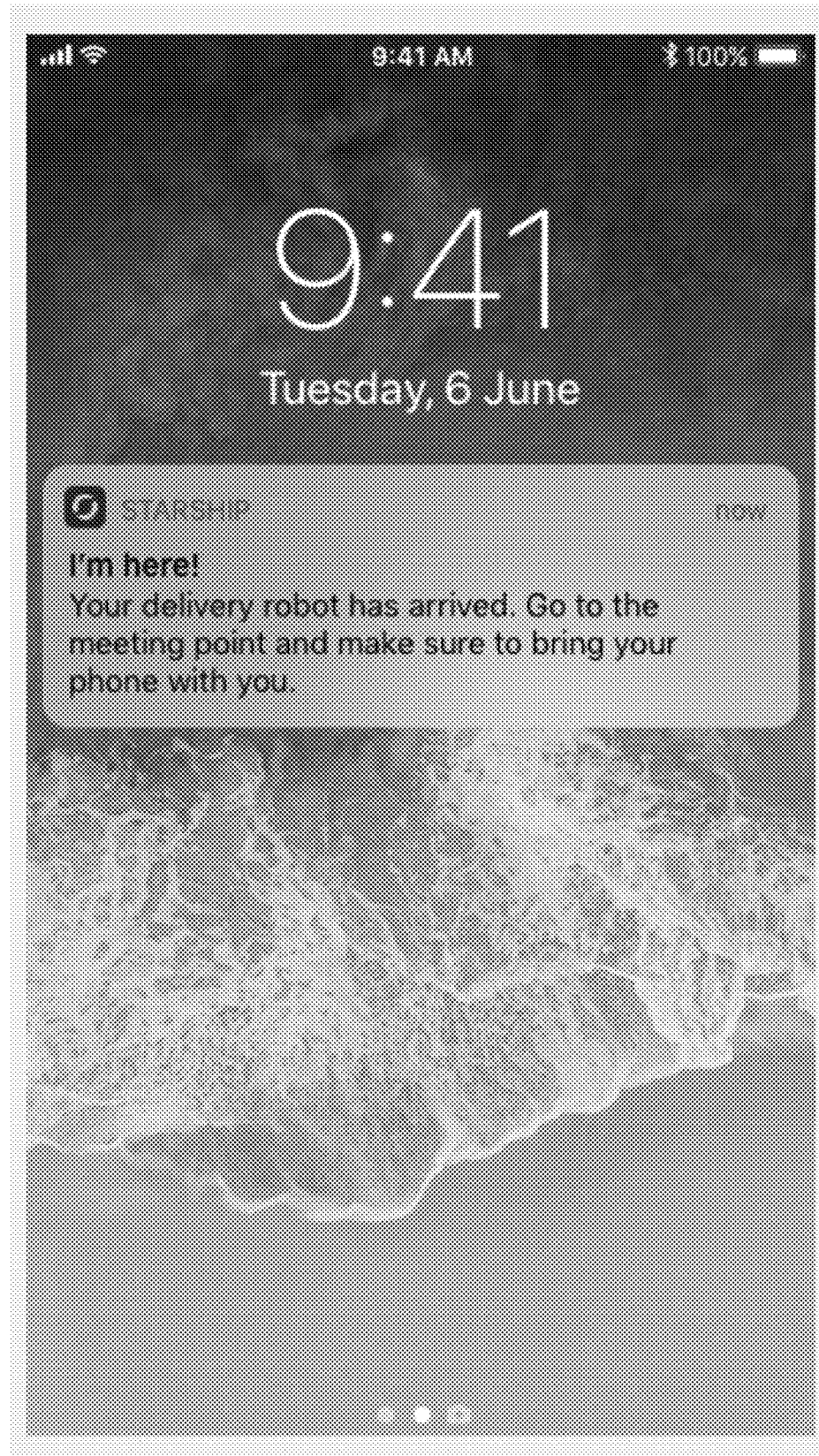
Figure 8K:
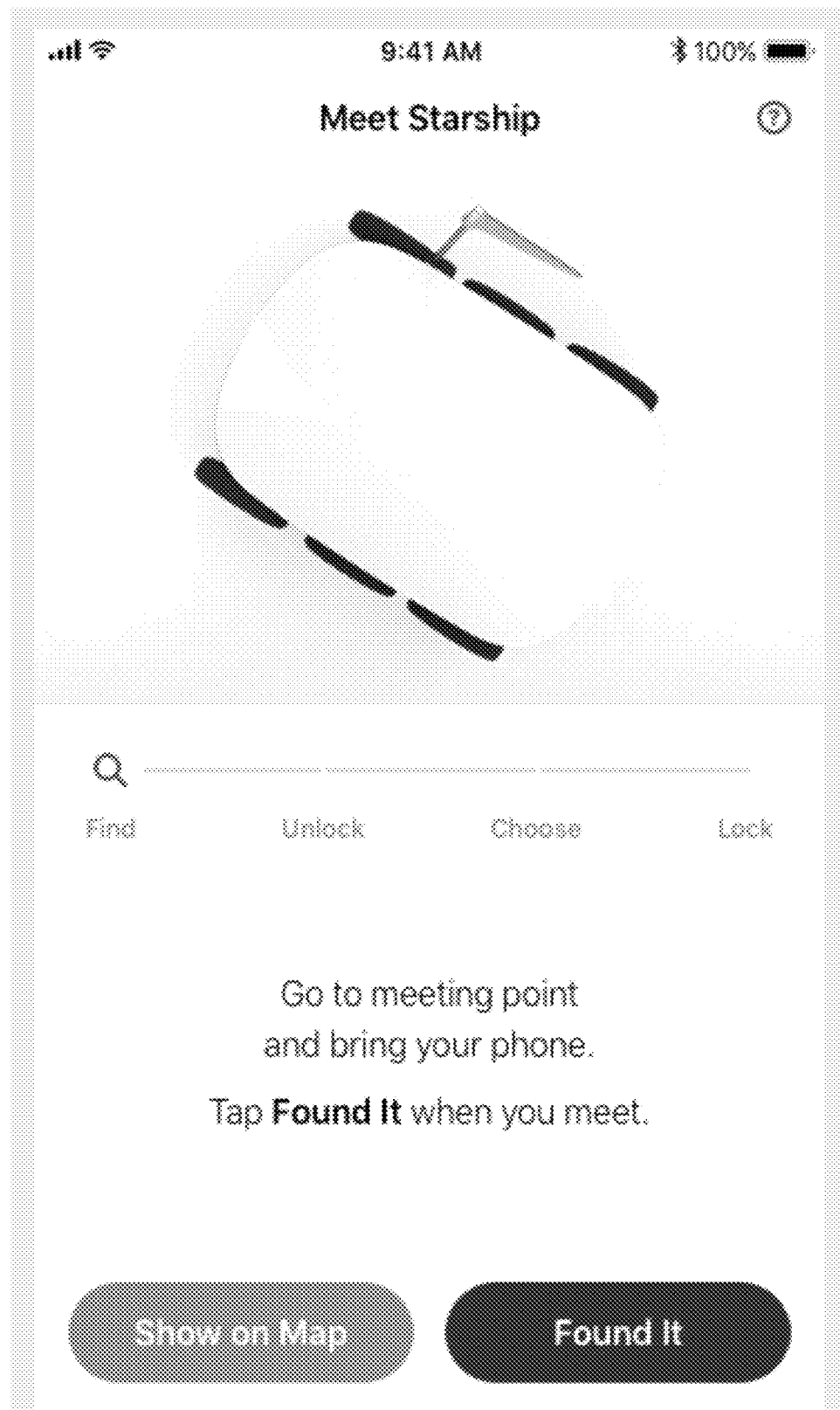
Figure 8I:
Figure 8M:
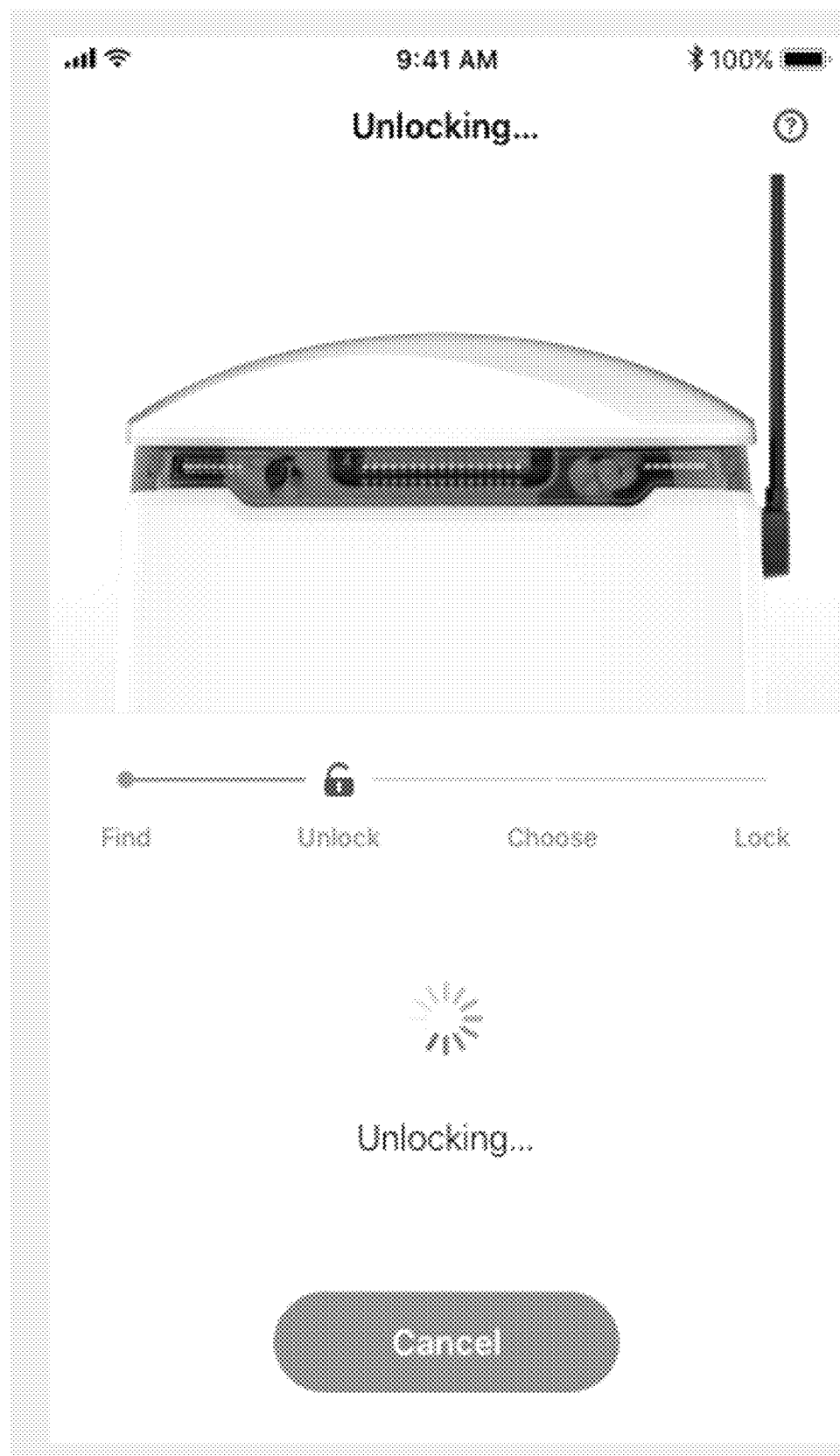
Figure 8N:
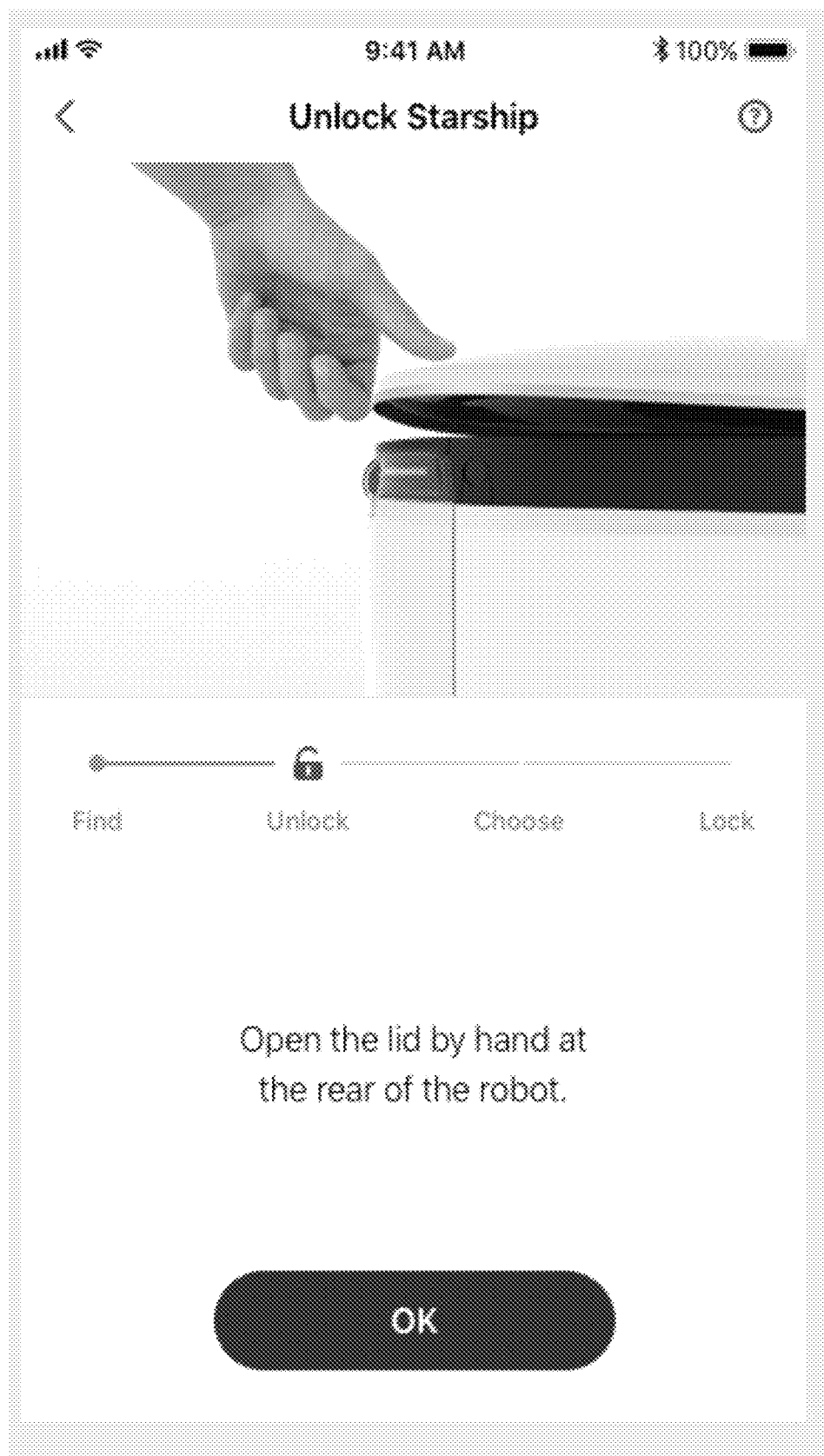
Figure 8O:
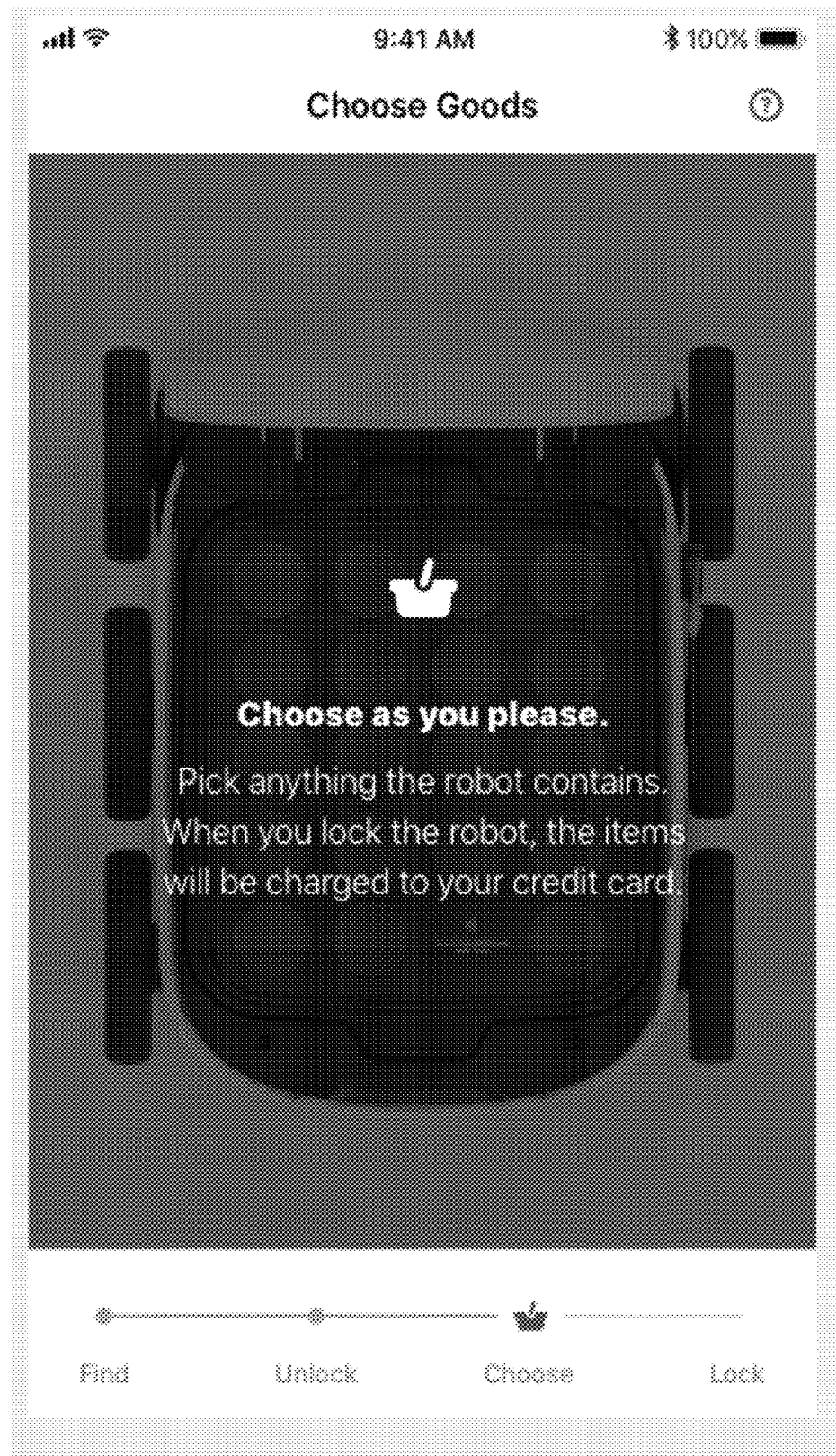
Figure 8P:
Figure 8Q:
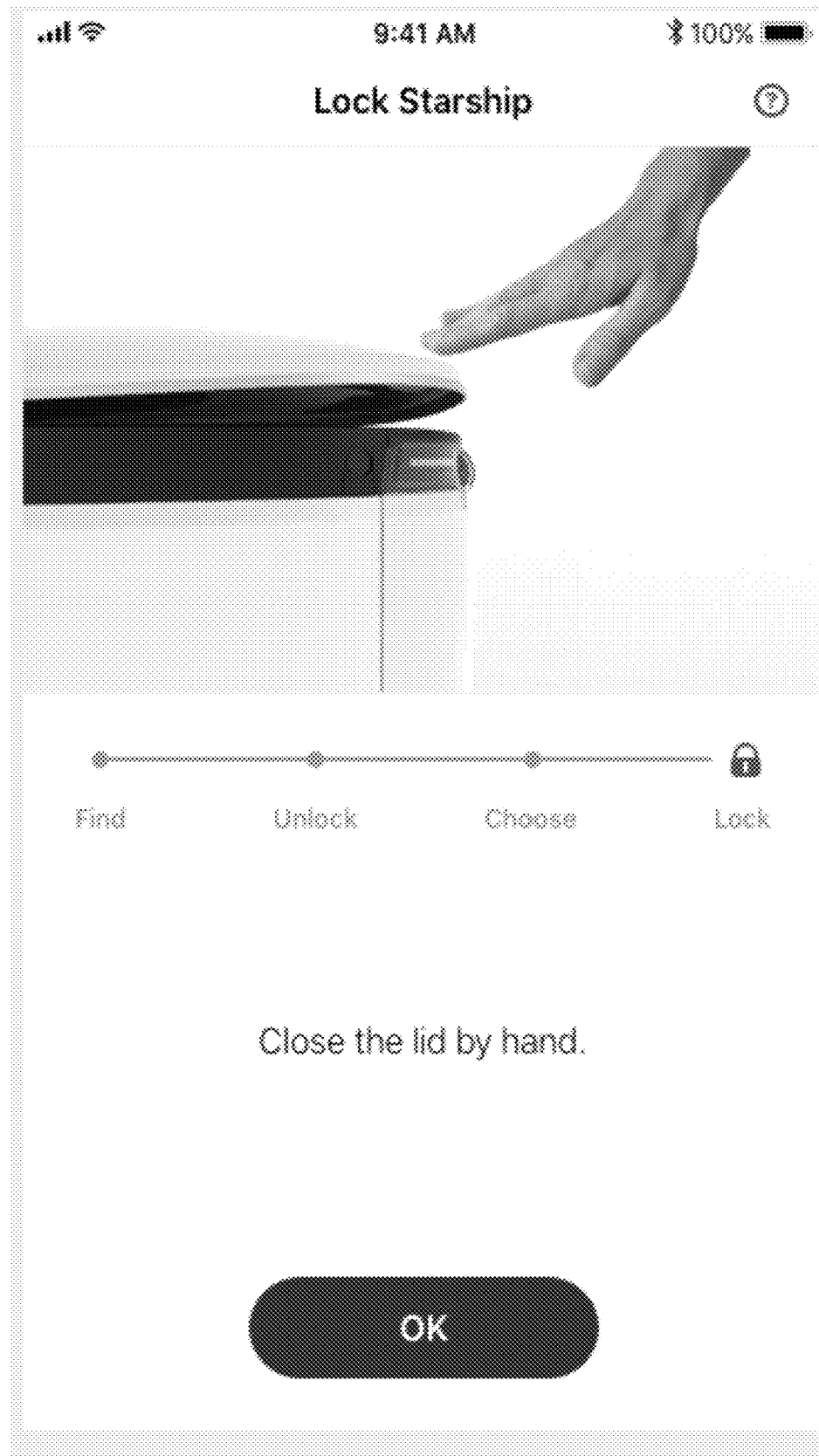
Figure 8R:
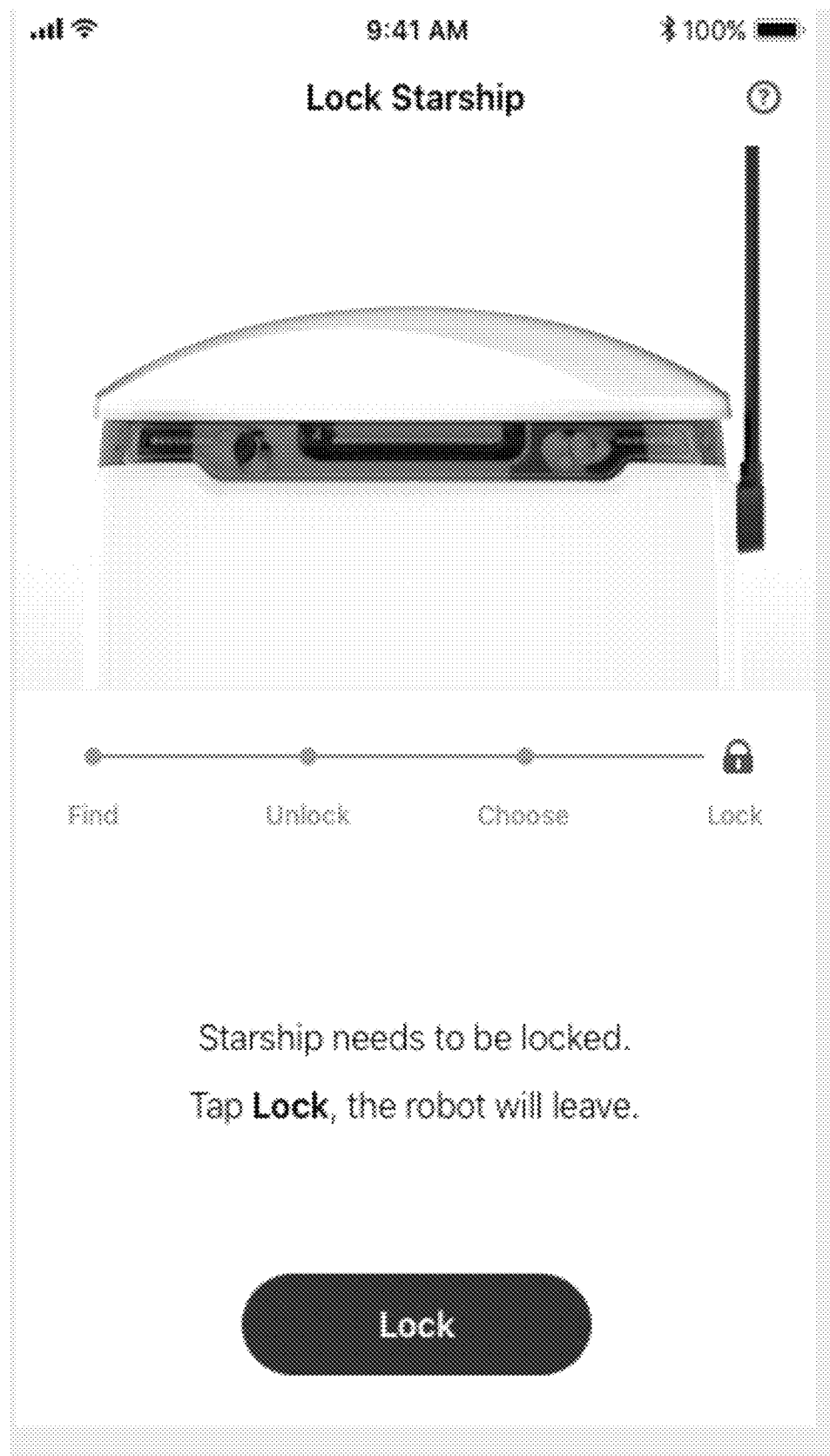
Figure 8S:
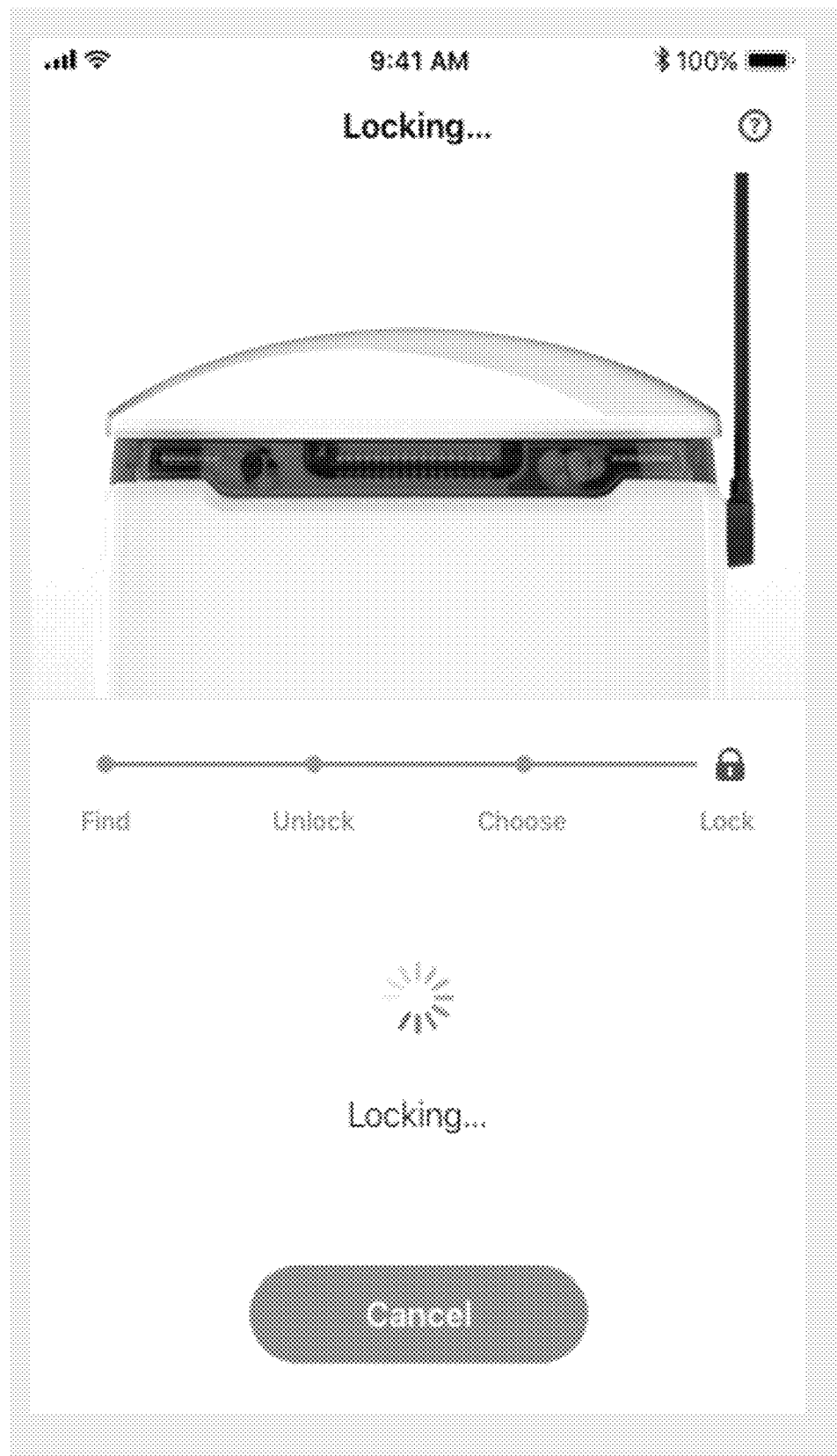
Figure 8T:
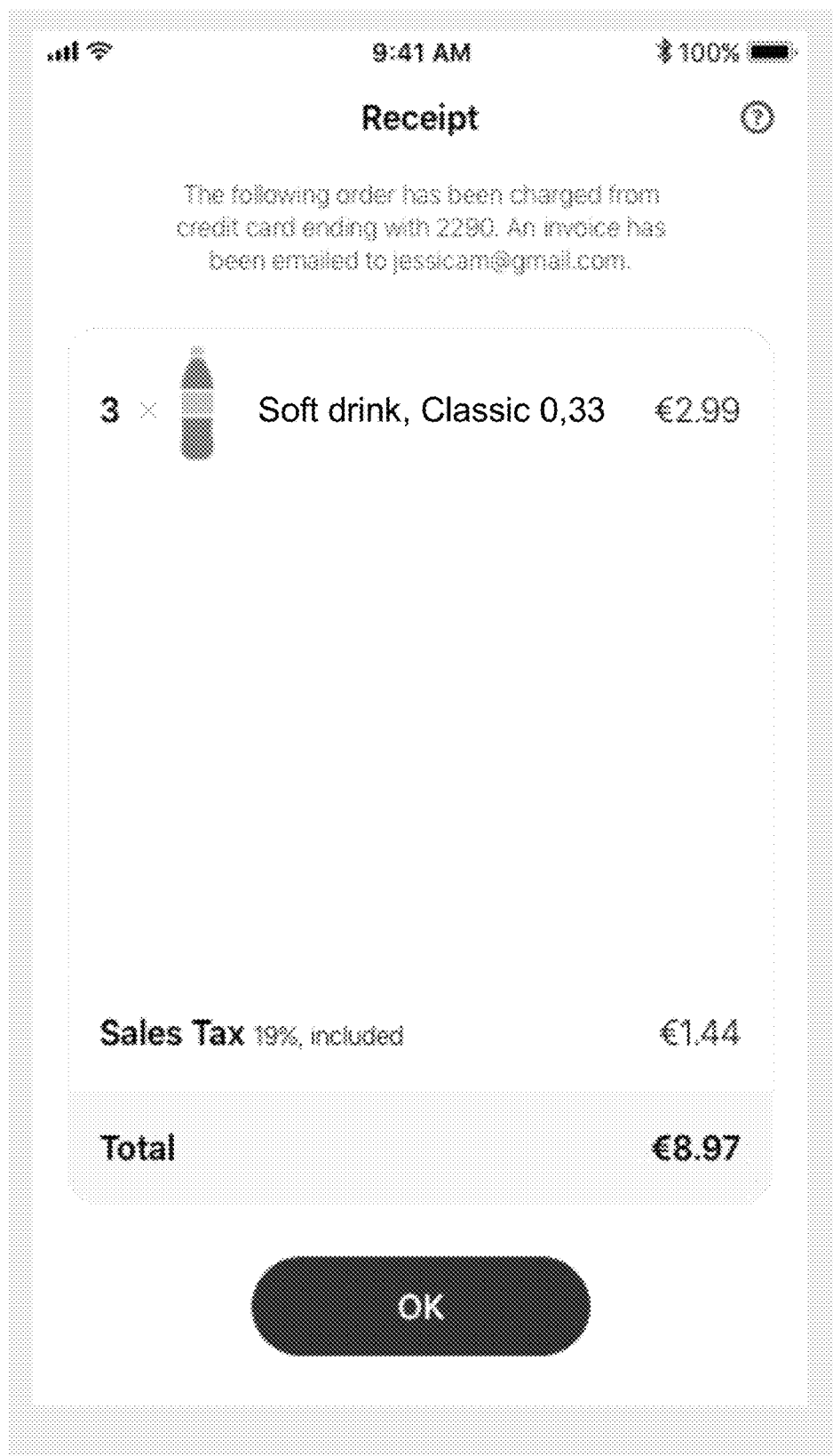
Figure 8U:
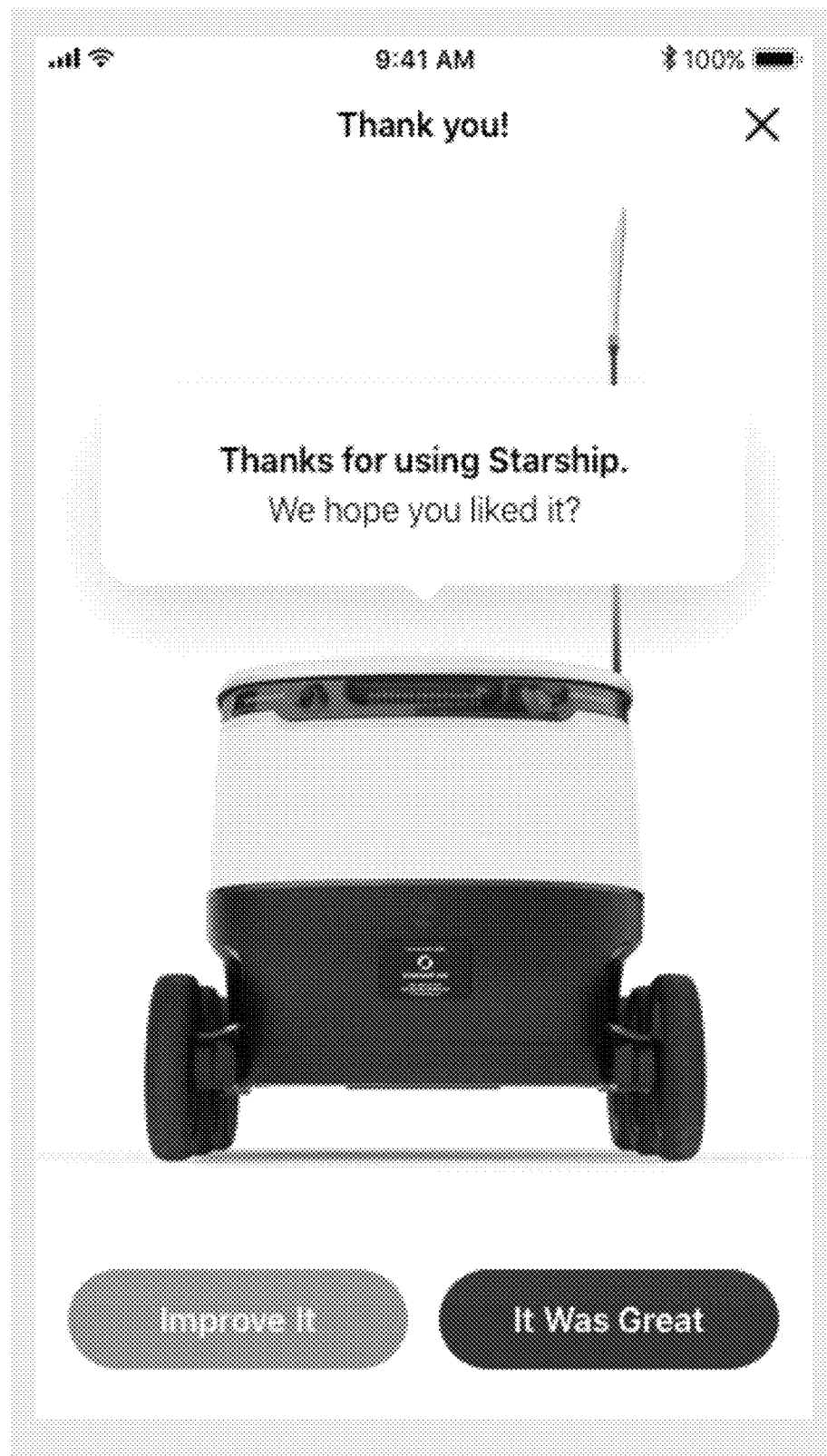

FIGS. 8(a)-8(u) comprises examples of an electronic application that can be used by a potential user (and/or customer) to communicate with the robot 1. FIG. 8(a) depicts a starting screen showing an image of the mobile robot 1.

FIG. 8(b) shows a selection screen where a user can choose which type of consumable item 100 they would be interested in. FIG. 8(b) also shows an option for package delivery, which the mobile robot 1 can also be configured to do, but which is optional in the case of the mobile robot 1 vending consumable items 100.

FIG. 8(c) shows a selection of beverages and snacks shown upon the user selecting the Drinks & Snacks category from the menu shown in FIG. 8(b). In the depicted embodiment, only a selection of drinks is shown. Various consumable items 100 can be selected by clicking on the icon. The price for each item is also shown. To the right of each icon, an estimated time to arrival is shown. This can be based on the user's current location.

FIG. 8(d) shows a screen where a user is prompted to set a meeting location for the robot. This meeting location is also referred in this application as a "second location". The user can select a convenient meeting spot on the map where the user would like the mobile robot 1 carrying consumable items 100 that the user is interested in to arrive. This location can be the user's present location, or another location in the vicinity of the user. The meeting location can also be farther from the user, in case they are currently on the way there, or planning to depart at a known time in the immediate future. FIG. 8(e) shows the user a map where they can track the robot's progress towards the meeting location.

FIG. 8(*f*) shows a payment screen where the user can enter the details of the payment means with which they would like to pay for the consumable items 100 purchased from the robot 1.

FIGS. 8(*g*) to 8(*j*) depict the interaction between ordering the robot and the robot arriving at the requested location. The estimated time of arrival is shown, the real time location of the robot, as well as a notification conveying that the robot is at the requested location or meeting point.

FIGS. 8(*k*) to 8(*n*) show the steps until the consumable items 100 within the robot 1 can be accessed: the user needs to find the robot, unlock the robot by clicking the corresponding command, and open the lid of the robot. Note, that one or more of those steps may be automated. That is, once the user clicks that they found the robot 1, the robot 1 may simply automatically unlock and lift the lid.

FIGS. 8(*o*) to 8(*s*) show the steps for removing consumable items 100 from the robot 1 and the closing the lid again. Note, that steps s), t) and u) are also optional. The user may be simply prompted to confirm that the correct consumable items 100 were removed, and the robot may automatically close and lock the lid following this.

FIG. 8(*t*) shows the screen with the removed consumable items 100 and the total price that the user will be charged for them.

FIG. 8(*u*) gives the user an option to leave feedback for the whole experience.

Figure 9:
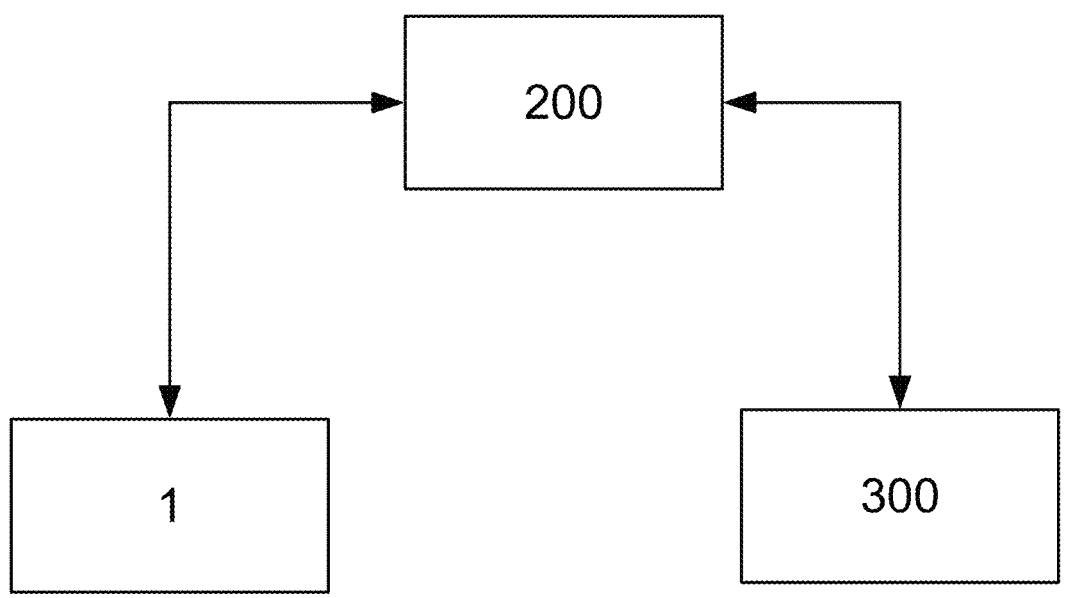
FIG. 9 schematically depicts a system for vending consumable items.

FIG. 9 schematically depicts a system for vending consumable items using a mobile robot 1. The mobile robot 1 can be in communication with a server 200. The server 200 can be in communication with a vending terminal 300. The server 200 can comprise a remote server, such as a cloud server or similar. The vending terminal 300 can comprise a personal mobile device such as a smartphone, tablet, wearable device or a similar device. The mobile robot 1 can communicate with the server 200 via a communication component such as a SIM card or a modem. The vending terminal 300 can communicate with the server via an electronic application such as an "app" on a smartphone. In a typical example, a user (or customer) using the vending terminal 300 can see whether any mobile robots 1 are available for vending services in the user's area of interest (such as, for example, a park or a university campus). The user can then send a request for a mobile robot 1 to come to a particular location at a particular time. This request can then go from the user's vending terminal 300 to the server 200, where it can be processed and sent as a command to the mobile robot 1. The mobile robot 1 can then navigate to the indicated location (preferably at least semi-autonomously, that is, navigating and travelling on its own except in certain situations where the robot 1 can request assistance). At the indicated location, the robot 1 can wait for the user using the vending terminal 300. The user can then remove the desired items 100, 100' from the mobile robot. The mobile robot 1 can then detect which items have been removed via the item sensor 30, and communicate this to the server 200. The server 200 can then communicate to the vending terminal 300 (and therefore to the user) how much they have to pay for the removed items. The payment can be processed directly via the server 200 or via a third party provider. Once the purchase is finalized via the vending terminal 300, the server 200 can send the mobile robot 1 a command to resume a standby mode (which can comprise following a certain trajectory within an area, staying at the present location, travelling to another location or similar modes).

Figure 10:
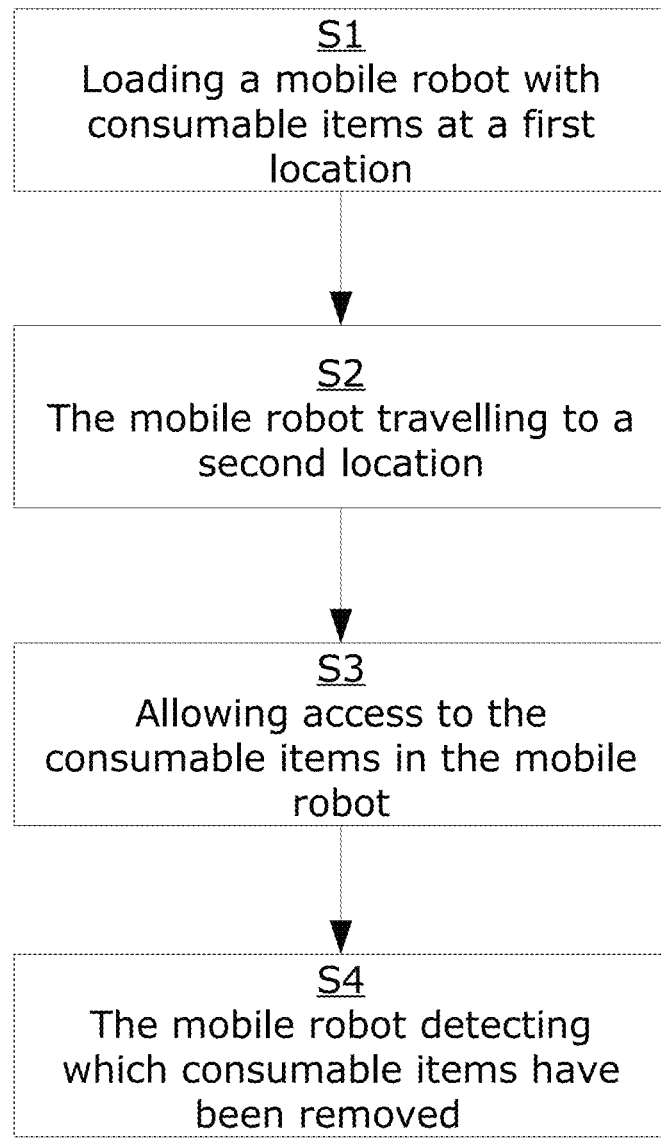
FIGS. 10 and 11 show flowcharts schematically outlining the steps of two methods for item vending using the mobile robot 1.

FIG. 10 shows a flowchart depicting the steps of using the mobile robot 1 as described above and below for item vending. In a first step S1, the mobile robot 1 is loaded with consumable items 100 at a first location. This first location can comprise a loading station where the consumable items 100 can be stored before being loaded into the robot 1. The robot 1 can also return to this first location to get refilled with consumable items 100. Such a location can comprise, for example, an automated hub comprising a storage area for consumable items 100. Additionally or alternatively, the first location can comprise a shop, a restaurant, a kiosk, a café, or a similar commercial establishment where the robot 1 may be loaded and reloaded with consumable items 100 automatically or manually.

In S2, the mobile robot travels to a second location. The second location can be selected by a user requesting the mobile robot 1 to come there as explained in the description to FIGS. 8(*a*)-8(*u*). The second location can also be part of the robot's circuit that it can be travel autonomously or semi-autonomously. In the former case, the robot may be spotted by a prospective user and stopped in order to view the available consumable items 100 and potentially purchase some of them.

In step S3, access is granted to the consumable items in the mobile robot 1. As previously explained, the consumable items 100 are preferably stored in the item space of the robot, even more preferably in the support elements. The item space is covered by a lid, which is preferably locked while the robot is travelling and until explicitly requested to be unlocked by a prospective user/customer. That is, allowing access to the consumable items 100 can comprise unlocking the lid so that it can be opened manually or automatically, and the item space can be accessed.

In step S4, the mobile robot detects which consumable items have been removed. The robot does this by using the item sensor. The item sensor can be as described above and below. The robot can be configured to detect each removed item individually.

Figure 11:
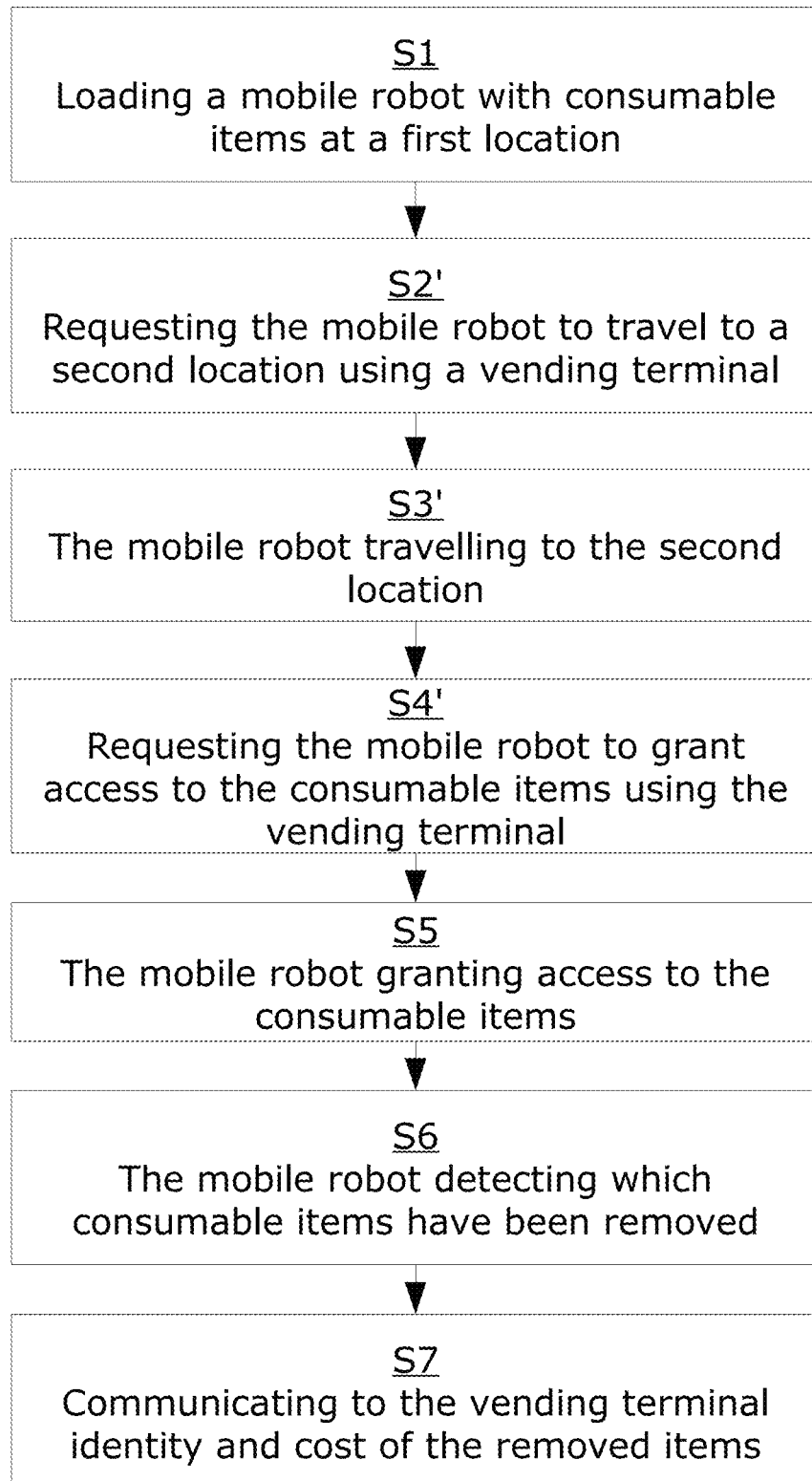

FIG. 11 also depicts a flowchart illustrating using the mobile robot 1 for consumable item 100 vending. Step S1 is the same as in FIG. 10 and comprises loading the mobile robot with consumable items at a first location. Step S2' comprises requesting the mobile robot to travel to a second location using a vending terminal 300. The vending terminal 300 can comprise a personal computing device such as a smartphone, tablet, wearable device or a similar device. The requesting can be done via an app. The communication between the robot and the vending terminal 300 can also be done via a server and not directly. That is, a user or a customer can request the mobile robot to come to a certain location via an app or a similar interface, and this request can be sent to a server, which can then forward it and/or send it as a command/instruction to the mobile robot 1.

Step S3' comprises the mobile robot 1 travelling to the second location as indicated by the vending terminal 300.

Step S4' comprises the vending terminal 300 requesting access to the consumable items 100. This can again be done via an interface such as an app, and via a server coordinating the communication.

In step S5, the mobile robot 1 grants access to the consumable items 100. This can be done by unlocking the lid of the robot and/or by lifting the lid so as to make the item space accessible.

In step S6, the mobile robot detects which consumable items have been removed. Step S6 corresponds to step S4 shown in FIG. 10.

Step S7 comprises communicating to the vending terminal identity and total cost of the removed items. Simply put, the items that the user withdrew can be shown on the vending terminal 300, preferably via an interface such as an app, and the price that the user will have to pay for the items would be displayed alongside them.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

We claim:

1. A mobile robot configured for vending items, the mobile robot comprising:
   a mobile base;
   a body comprising an item space;
   a plurality of support elements located in the item space and configured to support items; and
   an item sensor configured to detect presence of one or more items supported by each of the support elements,
   wherein the item sensor comprises a capacitive sensor comprising a base plate and a plurality of pads,
   wherein each of the pads comprises a conductive plate with the base plate configured as a second conductive plate for all of the pads, and
   wherein each of the pads is configured to be placed below a respective one of the support elements, and
   wherein the base plate and the plurality of pads are configured such that an item placed in or removed from at least one of the support elements changes a distance between the respective pad placed below said at least one of the support elements and the base plate, and
   wherein the item sensor is configured to detect removal of one or more items from the support elements.

2. The mobile robot according to claim 1, further comprising a lid configured to cover the item space, and wherein the mobile robot further comprises a lid sensor configured to detect whether the lid is open or closed.

3. The mobile robot according to claim 2 wherein the item sensor activates when the lid sensor detects that the lid is open.

4. The mobile robot according to claim 1 further comprising a second item sensor configured to detect at least one of:
   (i) different items supported by different support elements; and/or
   (ii) items different from the items supported by the support elements.

5. The mobile robot according to claim 4 wherein the second item sensor comprises a visual camera.

6. The mobile robot according to claim 1, wherein the mobile robot further comprises circuitry configured to detect changes in respective capacitances between the plurality of pads and the base plate.

7. The mobile robot according to claim 1, wherein the mobile robot further comprises an insert configured to removably fit into the item space, and wherein the insert comprises the support elements and the item sensor.

8. The mobile robot according to claim 7, wherein the insert comprises a top surface and wherein the support elements comprise indentations in the top surface of the insert.

9. The mobile robot according to claim 7, wherein the mobile robot further comprises an electronic locking element configured to fix the insert inside the item space.

10. A system configured for vending items, the system comprising:
    a server;
    a vending terminal; and
    a mobile robot comprising:
       a mobile base; and
       a body comprising an item space; and
       a plurality of support elements configured to support one or more items; and
       an item sensor configured to detect presence of one or more items supported by each of the support elements,
    wherein the server is configured to communicate with the mobile robot and the vending terminal, and
    wherein the item sensor comprises a capacitive sensor comprising a base plate and a plurality of pads, and
    wherein each of the pads comprises a conductive plate with the base plate configured as a second conductive plate for all of the pads, and
    wherein each of the pads is configured to be placed below a respective one of the support elements, and
    wherein the base plate and the plurality of pads are configured such that an item placed in or removed from at least one of the support elements changes a distance between the respective pad placed below said at least one of the support elements and the base plate, and
    wherein the item sensor is configured to detect removal of one or more items from the support elements.

11. The system according to claim 10 wherein the mobile robot is configured to allow access to its item space based on a command from the server, and wherein the item sensor is configured to detect one or more items removed from the support elements while access is allowed to the item space.

12. The system according to claim 11, wherein the mobile robot is configured to communicate which items have been removed from the support elements as detected by the item sensor to the server, and wherein the server is configured to communicate to the vending terminal which items have been removed and their cost.

13. The system according to claim 12 wherein the item sensor is further configured to detect any items returned to the support elements after being removed, and wherein the mobile robot is further configured to communicate which items have been returned to the support elements after being removed to the server, and wherein the server is configured to communicate to the vending terminal an updated list of removed items and their cost.

14. The system according to claim 10, wherein the mobile robot further comprises circuitry configured to detect changes in respective capacitances between the plurality of pads and the base plate.

15. The system according to claim 10, wherein the mobile robot further comprises an insert configured to removably fit into the item space, and wherein the insert comprises the support elements and the item sensor.

16. The system according to claim 15, wherein the mobile robot further comprises an electronic locking element configured to fix the insert inside the item space.

17. A method for vending items using a mobile robot, the method comprising:
providing the mobile robot comprising:
a mobile base;
a body comprising an item space;
a plurality of support elements configured to support items;
an item sensor configured to detect presence of one or more items supported by each of the support elements;
loading the support elements of the mobile robot with a plurality of items at a first location;
the mobile robot travelling to a second location;
allowing access to the items in the item space of the mobile robot at the second location; and
the mobile robot detecting which items have been removed from the support elements using the item sensor,
wherein the item sensor comprises a capacitive sensor comprising a base plate and a plurality of pads, and
wherein each of the pads comprises a conductive plate with the base plate configured as a second conductive plate for all of the pads, and
wherein each of the pads is configured to be placed below a respective one of the support elements, and
wherein the base plate and the plurality of pads are configured such that an item placed in or removed from at least one of the support elements changes a distance between the respective pad placed below said at least one of the support elements and the base plate, and
wherein the item sensor is configured to detect removal of one or more items from the support elements.

18. The method according to claim 17, further comprising:
providing a server and a vending terminal, wherein
the server is configured to communicate with the mobile robot and the vending terminal.

19. The method according to claim 18, wherein the method further comprises, before the mobile robot travelling to the second location,
the vending terminal requesting the mobile robot to travel to the second location by communicating with the server; and
the server directing the mobile robot to travel to the second location.

20. The method according to claim 18 further comprising:
the vending terminal requesting access to the item space to the server and the server commanding the mobile robot to allow access to the item space.

21. The method according to claim 18, further comprising:
the mobile robot communicating to the server which items have been removed, and the server communicating to the vending terminal which items have been removed and their cost.

22. The method according to claim 17, wherein the mobile robot further comprises a second item sensor, and wherein the method further comprises, after allowing access to the item space, using the second item sensor to detect at least one of:

(i) different items supported by different support elements; and/or
(ii) items different from the items supported by the support elements.

23. The method according to claim 17, wherein the mobile robot further comprises circuitry configured to detect changes in respective capacitances between the plurality of pads and the base plate.

24. The method according to claim 17, wherein the mobile robot further comprises an insert configured to removably fit into the item space, and wherein the insert comprises the support elements and the item sensor.

25. The method according to claim 24, wherein the mobile robot further comprises an electronic locking element configured to fix the insert inside the item space.

26. A method for on-demand item delivery by a mobile robot, the method comprising:
loading at least one mobile robot with a plurality of items at a first location;
using a vending terminal to request the mobile robot to travel to a second location;
the mobile robot travelling to the second location;
using the vending terminal to request access to the items;
the mobile robot allowing access to the items;
the mobile robot detecting the item or the items that have been removed; and
communicating to the vending terminal which items have been removed and their cost;
wherein the mobile robot comprises:
a mobile base;
a body comprising an item space;
a plurality of support elements configured to support the items; and
an item sensor configured to detect presence of the items supported by each of the support elements,
wherein the item sensor comprises a capacitive sensor comprising a base plate and a plurality of pads, and
wherein each of the pads comprises a conductive plate with the base plate configured as a second conductive plate for all of the pads, and
wherein each of the pads is configured to be placed below a respective one of the support elements, and
wherein the base plate and the plurality of pads are configured such that an item placed in or removed from at least one of the support elements changes a distance between the respective pad placed below said at least one of the support elements and the base plate, and
wherein the item sensor is configured to detect removal of one or more items from the support elements.

27. The method according to claim 26 further comprising:
the mobile robot detecting items that have been returned to the mobile robot; and
communicating to the vending terminal an updated list of removed items and their cost.

28. The method according to claim 26 further comprising loading at least two mobile robots with a plurality of different items at a first location and the vending terminal selecting a particular at least one item from a plurality of different items before requesting the mobile robot carrying the particular at least one item to travel to the second location.

29. The method according to claim 26, wherein the mobile robot further comprises circuitry configured to detect changes in respective capacitances between the plurality of pads and the base plate.

30. The method according to claim 26, wherein the mobile robot further comprises an insert configured to removably fit into the item space, and wherein the insert comprises the support elements and the item sensor.

31. The method according to claim 30, wherein the mobile robot further comprises an electronic locking element configured to fix the insert inside the item space.

* * * * *